(12) United States Patent
Goda

(10) Patent No.: US 9,332,151 B2
(45) Date of Patent: May 3, 2016

(54) IMAGE PROCESSING APPARATUS, METHOD OF CONTROLLING THE SAME AND STORAGE MEDIUM

(71) Applicant: CANON KABUSHIKI KAISHA, Tokyo (JP)

(72) Inventor: Junichi Goda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/642,932

(22) Filed: Mar. 10, 2015

(65) Prior Publication Data

US 2015/0264217 A1 Sep. 17, 2015

(30) Foreign Application Priority Data

Mar. 13, 2014 (JP) ................................. 2014-050533

(51) Int. Cl.
*G06F 15/00* (2006.01)
*H04N 1/21* (2006.01)
*H04N 1/00* (2006.01)

(52) U.S. Cl.
CPC ............. *H04N 1/21* (2013.01); *H04N 1/00891* (2013.01); *H04N 2201/0094* (2013.01)

(58) Field of Classification Search
CPC ................ H04N 1/21; H04N 1/00891; H04N 2201/0094

USPC ......................................................... 358/1.13
See application file for complete search history.

(56) References Cited

U.S. PATENT DOCUMENTS

| 8,761,526 | B2 | 6/2014 | Okuyama et al. |
| 2005/0050360 | A1* | 3/2005 | Hiramatsu ......... G03G 15/5004 726/4 |
| 2009/0201558 | A1* | 8/2009 | Kida .................. H04N 1/00885 358/404 |
| 2012/0275715 | A1 | 11/2012 | Okuyama et al. |
| 2014/0165011 | A1 | 6/2014 | Goda |

FOREIGN PATENT DOCUMENTS

JP 2012-234337 A 11/2012

* cited by examiner

*Primary Examiner* — Saeid Ebrahimi Dehkordy
(74) *Attorney, Agent, or Firm* — Fitzpatrick, Cella, Harper & Scinto

(57) ABSTRACT

An image processing apparatus, having a reconstruction circuit for which reconstruction based on construction data is possible, comprises a first storage unit configured to store the construction data; a writing unit configured to, when the image processing apparatus transitions to a power saving state, write the construction data, which is stored in a first storage unit, in a second storage unit which is different to the first storage unit; and a reconstruction unit configured to, when the image processing apparatus returns from the power saving state, reconstruct the reconstruction circuit based on the construction data stored in the second storage unit.

10 Claims, 22 Drawing Sheets

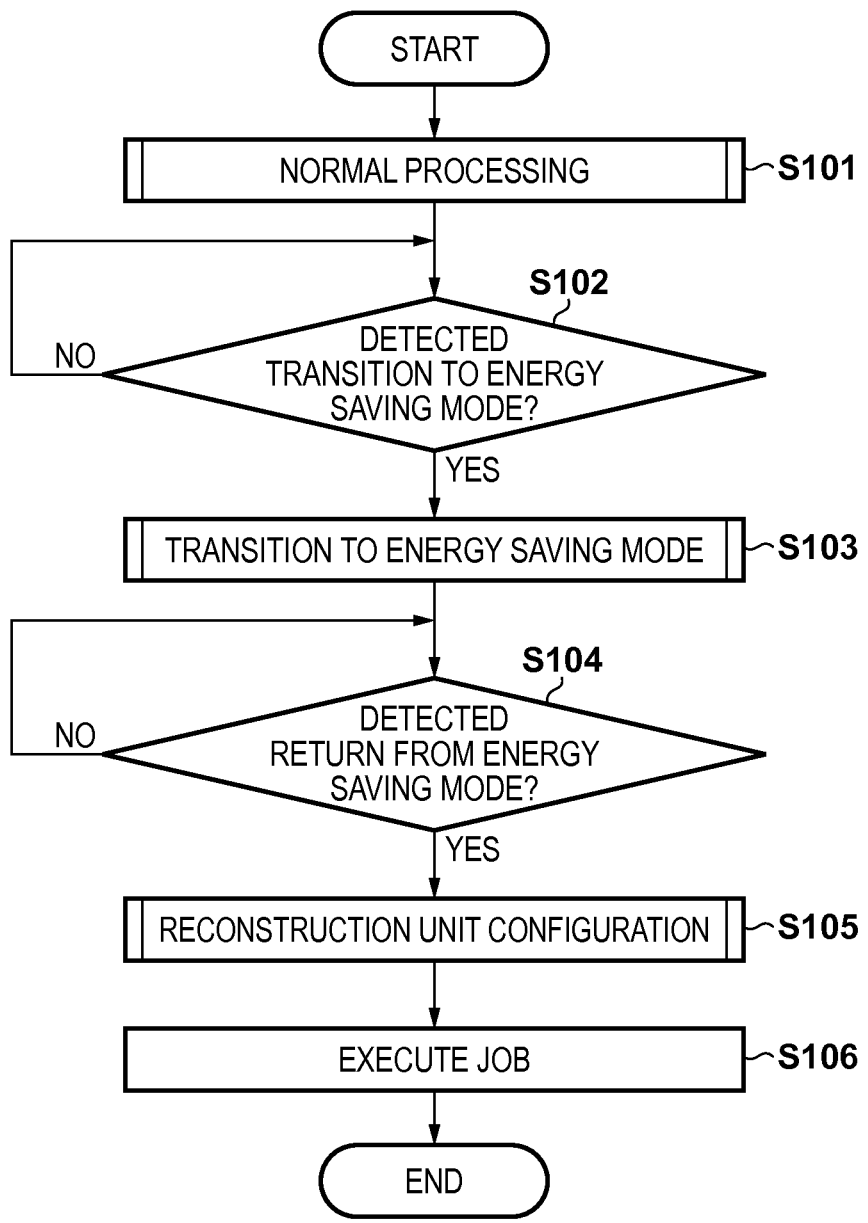

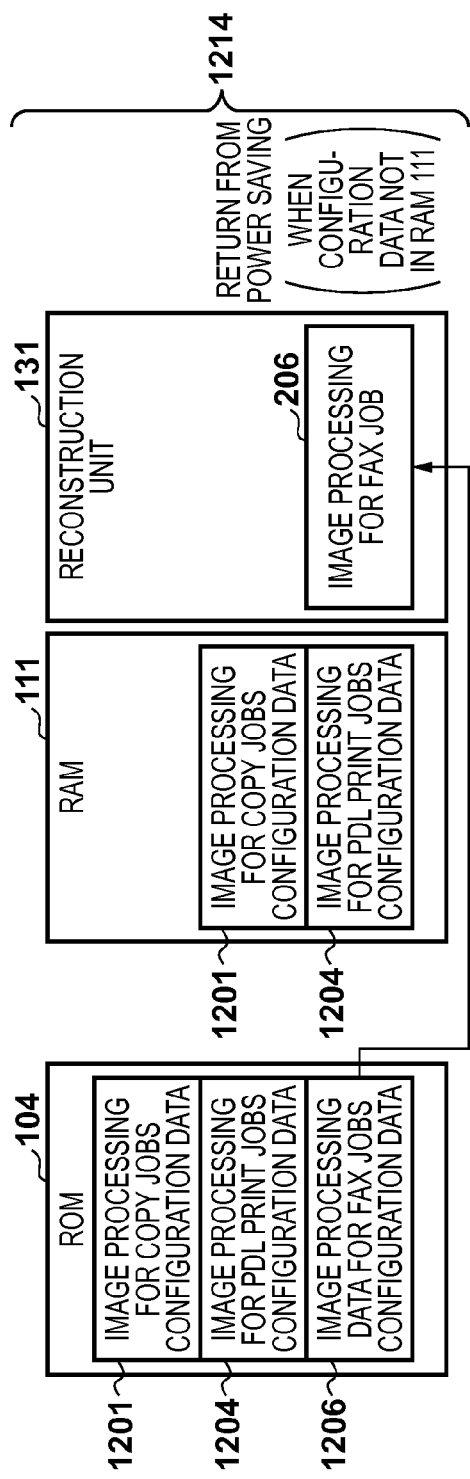

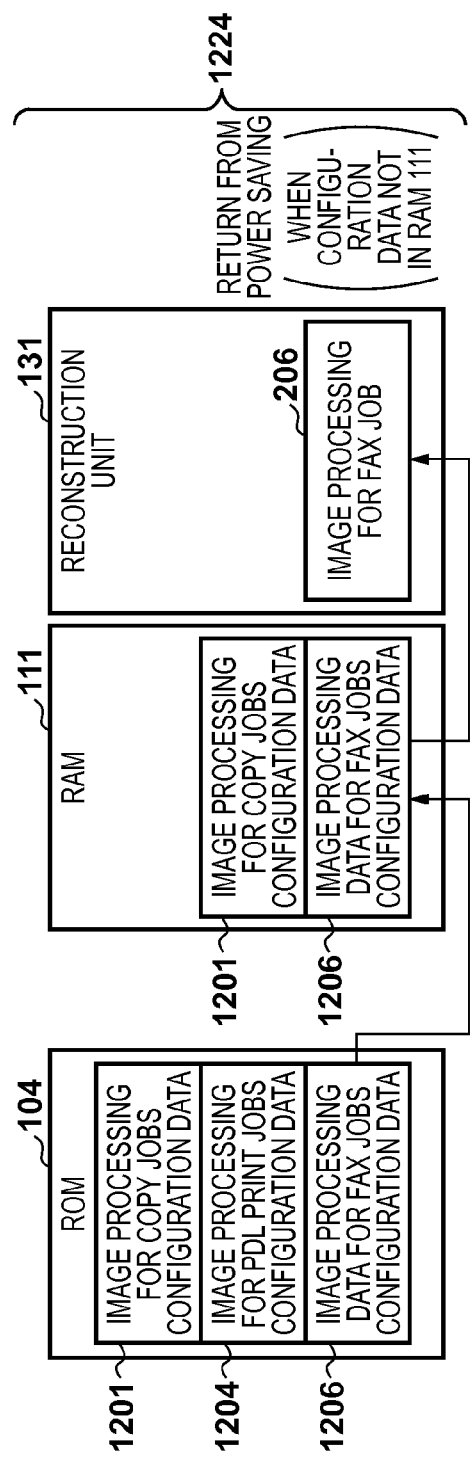

F I G. 12
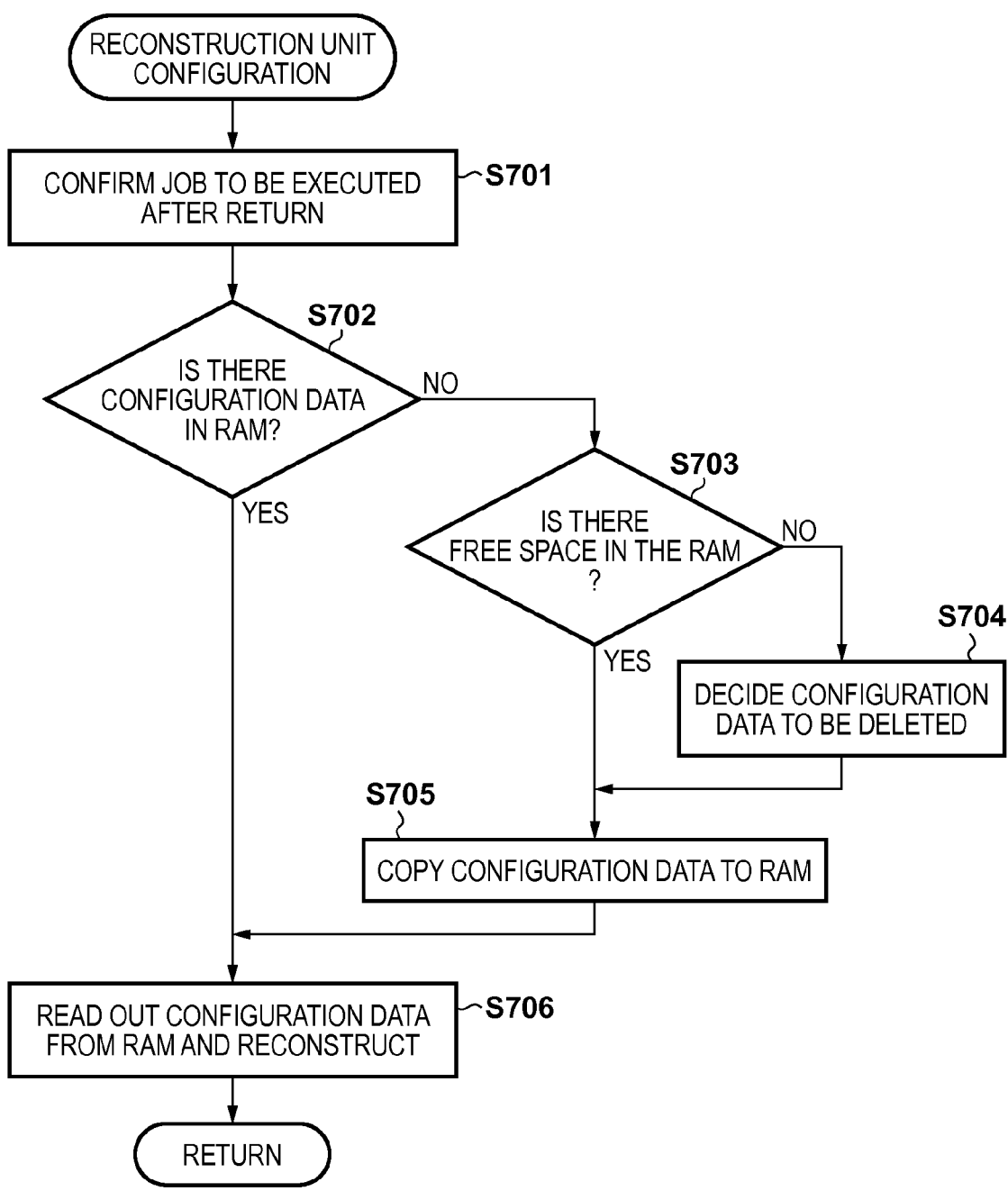

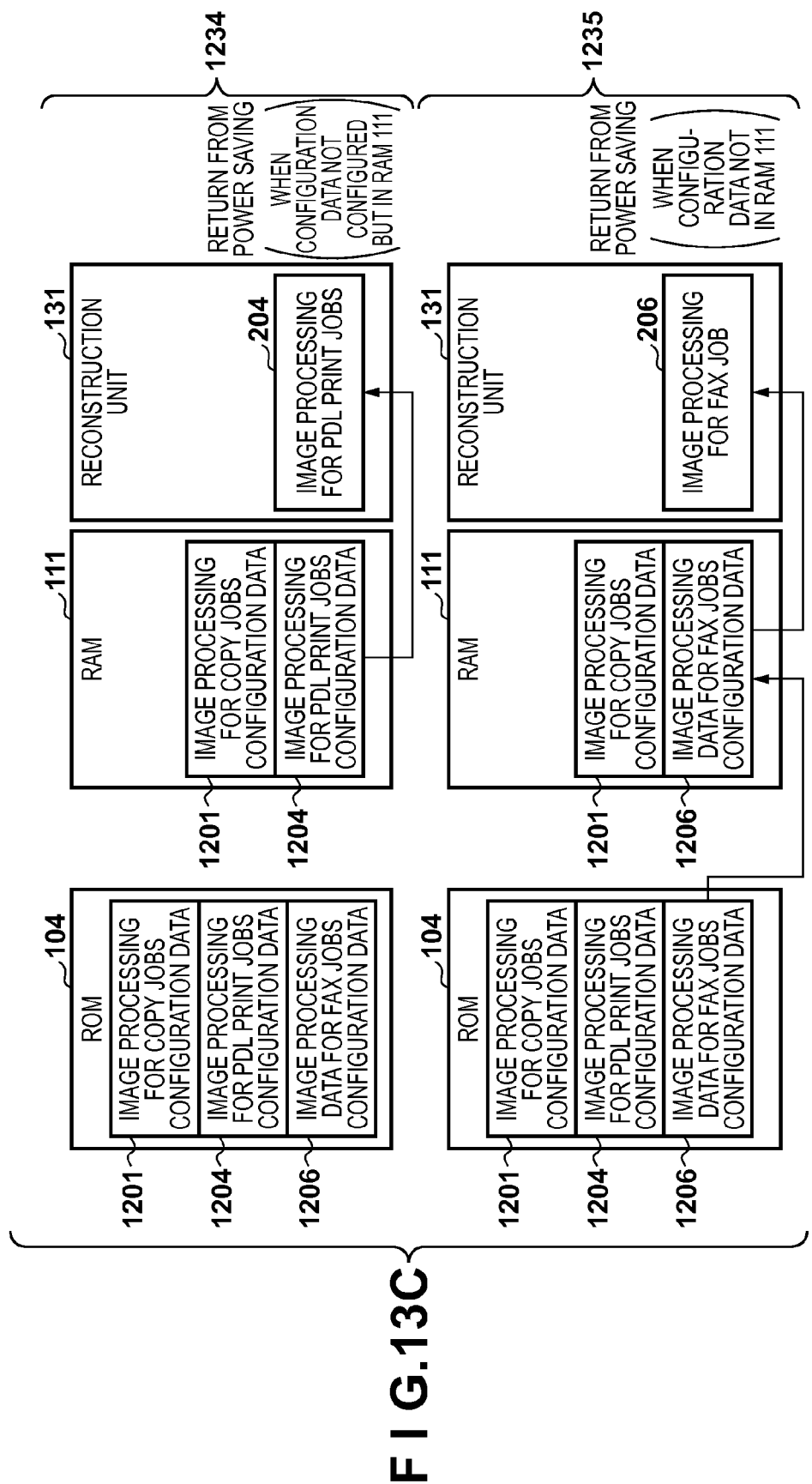

IMAGE PROCESSING APPARATUS, METHOD OF CONTROLLING THE SAME AND STORAGE MEDIUM

BACKGROUND OF THE INVENTION

1. Field of the Invention

The present invention relates to an image processing apparatus, a method of controlling the same, and a storage medium.

2. Description of the Related Art

Electric circuits capable of reconstruction such as PLDs (Programmable Logic Devices) and FPGAs (Field Programmable Gate Array) which are capable of changing the construction of the logic circuit are well known. In general, a change to the logic circuit of a PLD or an FPGA is realized by circuit construction information stored in a non-volatile memory such as a ROM, upon activation, being written to a configuration memory which is a volatile memory within the PLD or the FPGA. Also, because the information of the configuration memory is cleared upon a power disconnection, it is necessary to write the circuit construction information stored in the ROM into the configuration memory once again upon a power supply activation. An approach of constructing the logic circuit of a PLD or an FPGA only once in a state in which the power supply is being supplied in this way is referred to as a static reconstruction. In contrast to this, FPGAs, or the like, that are able to change the construction of the logic circuit dynamically while the logic circuit is in operation have been developed, and an approach of changing a logic circuit dynamically in this way is referred to as a dynamic reconstruction.

Also, there are FPGAs capable of rewriting only a circuit construction of a particular region rather than the circuit construction of the entire chip of the FPGA, and this kind of rewriting is referred to as a partial reconstruction. In particular, changing another circuit construction without causing the operation of a circuit that is in operation to stop is referred to as a dynamic partial reconstruction. In a dynamic partial reconstruction, upon a dynamic reconstruction, it is possible to reconstruct a logic circuit of the FPGA partially by rewriting only a portion of the regions of the configuration memory rather than rewriting all of the configuration memory. By employing such a dynamic partial reconstruction, it is possible to implement a plurality of logic circuits that can be switched time-divisionally in the regions of the FPGA, for example. As a result, it is possible to flexibly realize various functions with few hardware resources while maintaining high speed computational capabilities of the hardware.

However, while it is possible to change the circuit construction in operation, the time required for changing (rewriting) of the circuit construction is long, and the time is proportional to the size of the logic circuit configuration information written to the configuration memory. Techniques have been proposed for reducing the circuit construction rewrite time.

In Japanese Patent Laid-Open No. 2012-234337, a technique is disclosed in which processing having a high possibility of being processed next is estimated in image processing, and configuration data that realizes the processing estimated to be next is loaded into high speed configuration memory in advance in order to reduce conventional rewrite times. By loading in advance, the circuit construction data load time during image processing can be reduced, and image processing speeds can be optimized.

Also, an image processing apparatus such as an MFP (Multi-Function Printer) can select from a plurality or processes (a copy job, a print job, a SEND job, or the like) in accordance with a request from a user, and these image processes are realized by hardware or software. Also, in recent years, MFPs are made to have a power saving state for reasons of power consumption reduction, and have functions for transitioning into the power saving state in cases where there is no access to the MFP for a fixed time period, and for returning from the power saving state when once again the MFP is used. In particular, there is demand for the time period for recovery from the power saving state to be such that recovery is performed in as short a time period as possible, so that the MFP immediately is made to be useable, and thereby the convenience of the user is enhanced.

However, there is a problem with the above described conventional techniques as recited below. For example, in a case in which a reconstruction is performed having estimated processing to have a high possibility of being processed next in the image processing, it is possible to optimize image processing configuration data rewrite times as in the above described conventional technique. However, there is a problem in that because upon return from the power saving state, the processing content of the image processing that operates after return is determined, and after that the configuration data is reconstructed, the time period for return from the power saving state cannot be optimized.

SUMMARY OF THE INVENTION

The present invention enables realization of an arrangement in which by, prior to transitioning into a power state, configuration data having a high possibility of being used after the return being loaded in advance into memory that is capable of being read at high speed, and using that configuration data upon return, the time period for return from the power saving state is reduced.

One aspect of the present invention provides an image processing apparatus having a reconstruction circuit for which reconstruction based on construction data is possible, the apparatus comprising: a first storage unit configured to store the construction data; a writing unit configured to, when the image processing apparatus transitions to a power saving state, write the construction data, which is stored in a first storage unit, in a second storage unit which is different to the first storage unit; and a reconstruction unit configured to, when the image processing apparatus returns from the power saving state, reconstruct the reconstruction circuit based on the construction data stored in the second storage unit.

Another aspect of the present invention provides a method of controlling an image processing apparatus having a reconstruction circuit for which reconstruction based on construction data is possible, a first storage unit for storing the construction data, and a second storage unit different from the first storage unit, the method comprising: when the image processing apparatus transitions to a power saving state, writing the construction data, which is stored in the first storage unit, in the second storage unit; and when the image processing apparatus returns from the power saving state, reconstructing the reconstruction circuit based on the construction data stored in the second storage unit.

Still another aspect of the present invention provides a non-transitory computer-readable storage medium storing a program for causing a computer to execute each step of the method of controlling the image processing apparatus.

Further features of the present invention will become apparent from the following description of exemplary embodiments (with reference to the attached drawings).

BRIEF DESCRIPTION OF THE DRAWINGS

FIG. 4 is a flowchart for showing an overall control flow of the image processing apparatus according to the first embodiment.

FIGS. 5A to 5C are a view for showing a storage destination for configuration data of the image processing apparatus, and a state of an image processing circuit comprised in a reconstruction unit 131 according to the first embodiment.

FIGS. 9A to 9C are a view for showing a storage destination for configuration data of the image processing apparatus, and a state of an image processing circuit comprised in the reconstruction unit 131 according to a second embodiment.

FIG. 12 is a flowchart for showing a control flow upon return from a power saving mode according to the second embodiment.

FIGS. 13A to 13C are a view for showing a storage destination for configuration data of the image processing apparatus, and a state of an image processing circuit comprised in the reconstruction unit 131 according to the third embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Image Processing Apparatus Configuration

Below, with reference to FIG. 1 through FIG. 8 explanation will be given for a first embodiment of the present invention.

Figure 1:
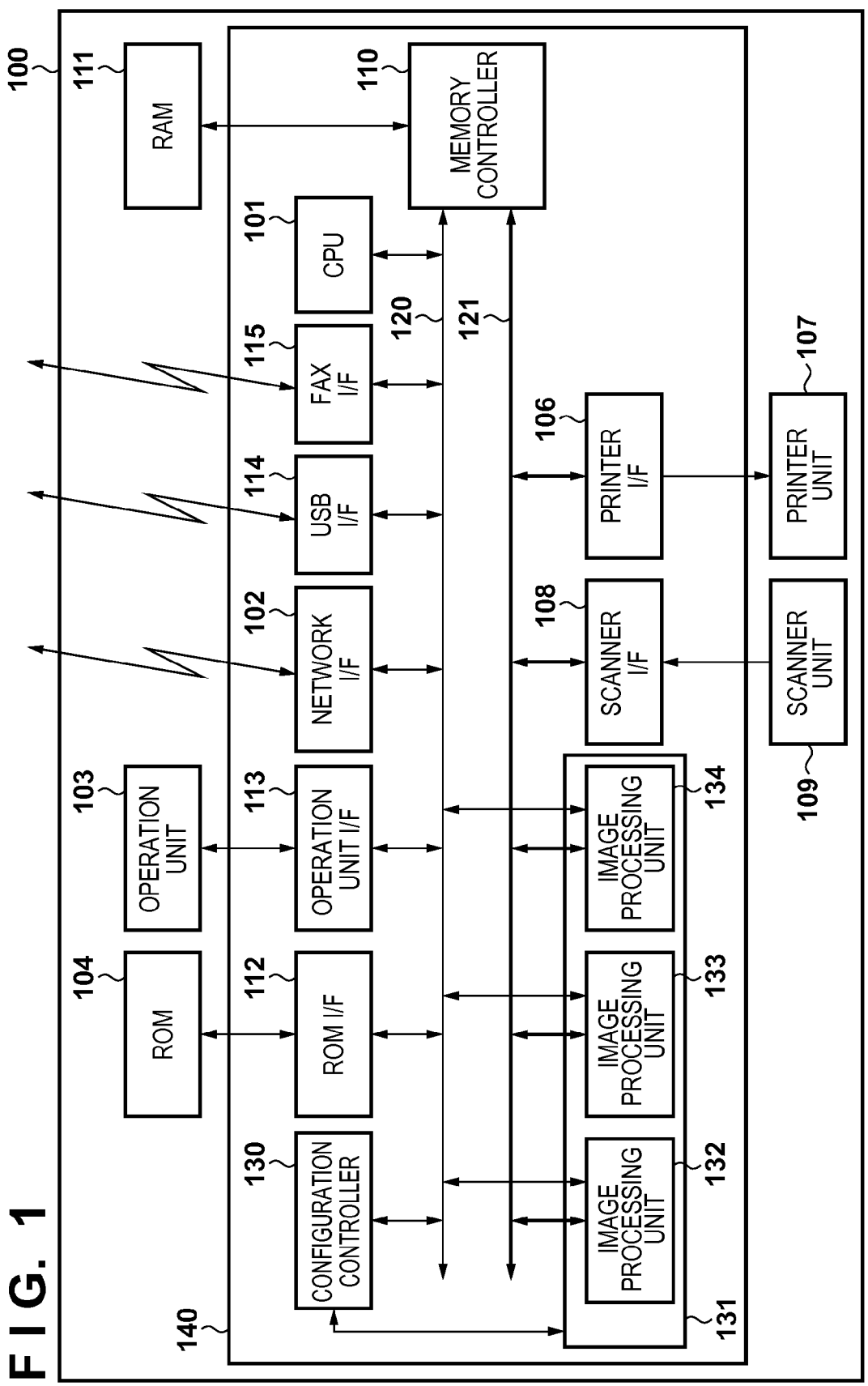
FIG. 1 is a block diagram for showing an example of a configuration of an image processing apparatus according to a first embodiment.

Firstly, with reference to FIG. 1, explanation will be given for a block diagram of a device configuration of an image processing apparatus relating to embodiments of the present invention. In the present embodiment, explanation will be given for a case in which an image processing apparatus 100 is a multi-function peripheral having a scanner unit and a printer unit.

The image processing apparatus 100 comprises an operation unit 103 for a user that uses the image processing apparatus 100 to perform various operations, a scanner unit 109 that scans image information of an original, and a printer unit 107 that prints an image onto a sheet based on image data. The scanner unit 109 comprises a CPU for controlling the scanner unit 109, and an illumination lamp and a scanning mirror for performing a read of an original. The printer unit 107 comprises a CPU for controlling the printer unit 107, and a photosensitive drum and a fixing device for performing image formation (printing) and fixation. The operation unit 103 has a power saving key, and when the power saving key is pressed, transition into a power saving state or return from the power saving state is performed.

Also, the image processing apparatus 100 comprises an FPGA 140 equipped with a dynamic reconstruction unit which is a controller for controlling the image processing apparatus 100. In this example, the FPGA 140 is equipped with a CPU 101 which comprehensively controls the operation of the image processing apparatus 100. The CPU 101 executes programs for controlling the FPGA 140 or a configuration controller 130 which controls reconstruction. Note that the FPGA 140 being provided with the CPU 101 is only one example, and a CPU may also be provided externally to the FPGA 140.

Also, the image processing apparatus 100 comprises a ROM (a first storage unit) 104 which stores a boot program that the CPU 101 executes and the logic circuit configuration information for configuring the FPGA 140. Also, the image processing apparatus 100 comprises a RAM (second storage unit) 111 which is a system work memory for the CPU 101 to operate, and an image memory into which image data is temporarily stored. Also, the RAM 111 is a memory into which a duplication of logic circuit configuration information stored in the ROM 104 is stored, so that it can be read at high speed.

The FPGA 140 is equipped with the CPU 101, a network I/F 102, a printer I/F 106, a scanner I/F 108, a memory controller 110, a ROM I/F 112, an operation unit I/F 113, a USB I/F 114, a FAX I/F 115, the configuration controller 130, and a dynamic reconstruction unit (reconstruction circuit) 131. The reconstruction unit 131 is dynamically reconstructable (rewritable), and partially rewritable. In other words, when a circuit reconstructed in a portion of the reconstruction unit 131 is operating, it is possible to reconstruct another circuit in a separate portion that does not overlap the portion that the circuit covers. In the reconstruction unit 131 are comprised an image processing unit 132, an image processing unit 133, and an image processing unit 134 for which the logic circuits for performing the image processing can be partially reconstructed. Note that an embodiment is shown in which the number of image processing units comprised in the reconstruction unit 131 in the present embodiment is three, but the number of image processing units is not limited to three. The configuration controller 130 controls the circuit construction (configuration) of the reconstruction unit 131.

Image data is input into the scanner I/F 108 from the scanner unit 109. Image data is output to the printer from the printer I/F 106. The image processing units 132, 133 and 134 of the reconstruction unit 131, the scanner I/F 108, and the printer I/F 106 are connected to an image bus 121 for transferring processed image data.

The CPU 101 comprehensively controls the operation of the image processing apparatus 100 and performs communication (transmission/reception) with a general-purpose computer on a network via a network I/F (network interface) 102. Also, the CPU 101, via a USB I/F (USB interface) 114, performs communication (transmission/reception) with a general-purpose computer connected to the image processing apparatus 100. Also, the CPU 101, via the FAX I/F (facsimile interface) 115, connects to a telephone public circuit network, and performs communication (transmission/reception) with other image processing apparatuses and facsimile apparatuses. There is a CI detection circuit in the FAX I/F 115 for detecting a call signal (CI signal: Call Indicator) from the telephone public circuit network. The ROM I/F 112 writes a boot program that the CPU 101 executes to the ROM 104 in which logic circuit configuration information (configuration data) for configuring the reconstruction unit 131 is stored, and controls a readout operation.

Also, the FPGA 140 comprises a system bus 120 over which the CPU 101, the network I/F 102, the operation unit 103, the ROM I/F 112, the configuration controller 130, and the reconstruction unit 131 are connected with each other. The CPU 101 performs parameter setting for the image processing units 132, 133 and 134 configured in the reconstruction unit 131, the scanner I/F 108, and the printer I/F 106 via the system bus 120. The RAM 111 is a system work memory for the CPU 101 to operate, and is also an image memory for temporarily storing image data, and also the RAM 111 is a memory into which a duplication of logic circuit configuration information stored in the ROM 104 is stored, so that it can be read at high speed. The memory controller 110 controls write and read operations for the RAM 111. The memory controller 110 is connected to the system bus 120 and the image bus 121, and exclusively switches between access of the bus master RAM 111 connected to the image bus 121, and access of the bus master RAM 111 connected to the system bus 120.

<Configuration Data>

Next, with reference to FIG. 2, explanation will be given for configuration data (construction data) that shows an image processing capability configuration configured in the reconstruction unit 131 in the image processing apparatus 100 according to the present embodiment. The image processing apparatus 100 reconstructs the reconstruction unit 131 using the configuration data explained below. Note that the configuration data can be divided into functional units (functional blocks). Additionally, the functional blocks may be divided to an arbitrarily level, and, for example, a later explained image processing unit for reading 202 which has a plurality image processing capabilities may be one functional block. Configuration may also be such that a functional block is divided further so as only to have a single image processing capability, such as in the case of a segmentation processing unit 211, for example. A plurality of functional blocks can be configured in the reconstruction unit 131.

The image processing apparatus 100 at least has a function for copying an original read by the scanner unit 109 (a copy job), and a function for printing print data delivered from an external printer driver (a PDL print job) as services that it can provide. Also, the image processing apparatus 100 has a function for printing FAX data received from the FAX I/F 115 (a FAX job). In a case of an image processing system to which a dynamic reconstruction technique is applied, an image processing capability that is required is constructed in the reconstruction unit 131 in accordance with a function selected by the user, and then the actual processing is performed.

Reference numeral 201 denotes an image processing for copy jobs construction which is constructed in the reconstruction unit 131 upon execution of a copy job. The image processing for copy jobs construction 201 is comprised of the image processing unit for reading 202 and an image processing unit for printing 203. Also, as functions other than those for image processing, a read DMAC (DMA Controller) 250 for reading an image from the RAM 111 via the image bus 121, and a write DMAC 251 for writing the image to the RAM 111 are included in the configuration.

Upon execution of a copy job, image data inputted from the scanner unit 109 is input into the image processing unit for reading 202. The image processing unit for reading 202 includes, for example, the segmentation processing unit 211, a table conversion processing unit 212, and a filter processing unit 213. The segmentation processing unit 211, by detecting a character region from an input image, determines an image region, and generates an image region signal used in later image processing. The table conversion processing unit 212 performs a table conversion in order to convert image data, which is read luminance data, into density data. The filter processing unit 213 performs computational processing with a digital spatial filter in accordance with an objective such as edge enhancement, for example. The image data for which the above described image processing for reading has completed is transferred to the image processing unit for printing 203 via the image bus 121. Of course, it is possible to transfer to the image processing unit for printing 203 in a pipeline without transferring to the image bus 121.

The image processing unit for printing 203 includes an undercolor removal processing unit 214, a color space conversion unit 215, a gamma correction processing unit 216, and a halftone processing unit 217. The undercolor removal processing unit 214 performs processing for removing a background color in a case where image data read from an original having a light colored background is sent. The color space conversion unit 215 performs a CMYK conversion in accordance with output characteristics of the image processing apparatus of RGB data. In the gamma correction processing unit 216, an image data density conversion is performed. The halftone processing unit 217 performs halftone processing on the data of each color. The specific configuration of the halftone processing unit is that it performs screen processing or error diffusion processing. The screen processing converts into N values using a predetermined plurality of dither matrices and inputted image data. Also, the error diffusion processing causes differences between input image data and predetermined thresholds to be diffused in relation to surrounding pixels to which processing for conversion into N values will be performed thereafter when conversion into N values is performed by comparing the input image data with the thresholds.

Image data for which the above described image processing for printing has finished is transferred to the printer I/F 106 via the image bus 121, and output from the printer unit 107. Of course, the above described flow is only one example, and it is possible to execute processing having configured other image processing capabilities into the reconstruction unit 131.

Reference numeral 204 denotes an image processing for PDL print jobs construction that is constructed in the reconstruction unit 131 upon execution of a PDL (PRINT DESCRIPTION LANGUAGE) print job. The image processing for PDL print jobs construction 204 includes an RIP processing unit 218 and the image processing unit for printing 203. The RIP processing unit 218 is a raster image processor (RIP) function for expanding a page description language (PDL) included in a print job received from a general-purpose computer (not shown) connected via the network I/F 102 into a bitmap image. Also, similarly to the image processing for copy jobs construction 201, the read DMAC 250 and the write DMAC 251 for performing a transfer of an image via the image bus 121 are included.

Upon execution of a PDL print job, the PDL data input by the general-purpose computer is first input into the RIP processing unit 218 and the PDL data is converted into a bitmap image. The image data, after being converted into the bitmap image, is inputted into the image processing unit for printing 203, and the processing of the previously explained undercolor removal processing unit 214, color space conversion unit 215, gamma correction processing unit 216, and halftone processing unit 217 are executed.

Here, the function has the same name as the image processing for printing which is performed upon execution of the copy job, but configuration may be taken such that differing H/W is used for a PDL job. For example, for the halftone processing unit 217, it is possible to construct the H/W to be different to when the copy job is executed so that the halftone processing is executed by the error diffusion processing upon execution of a copy job, by the screen processing upon a PDL print.

Image data for which the above described image processing for printing has finished is transferred to the printer I/F 106 via the image bus 121, and output from the printer unit 107. Of course, the above described flow is only one example, and it is possible to execute processing having configured other image processing capabilities into the reconstruction unit 131.

Reference numeral 206 denotes an image processing for FAX jobs construction constructed in the reconstruction unit 131 upon reception of a FAX job. The image processing for FAX jobs construction 206 includes an image processing unit for FAX 205 and the read DMAC 250 and the write DMAC 251 for performing transferring of images via the image bus 121. The image processing unit for FAX 205 includes a tailing-blur processing unit 219, a scaling processing unit 220, and a smoothing processing unit 221. Upon reception of a FAX job the image data inputted by a public switched telephone network via the FAX I/F is inputted into the tailing-blur processing unit 219. In the tailing-blur processing unit 219, in order to prevent a fixing explosion, processing for thinning the pixels of the image data is performed as appropriate. After this, the image data is input into the scaling processing unit 220. In the scaling processing unit 220, a resolution conversion is performed in order to convert the image data received from the public switched telephone network into a resolution of the image processing apparatus 100. In the smoothing processing unit 221 processing for smoothing jaggies (jaggedness in the image that appears at a monochrome boundary portion such as a diagonal line) of the image data after the resolution conversion is performed. Image data for which the above described image processing for FAX has finished is transferred to the printer I/F 106 via the image bus 121, and output from the printer unit 107. Of course, the above described image processing for FAX is only one example, and it is possible to execute other image processing capabilities by constructing them in the reconstruction unit 131.

Figure 2:
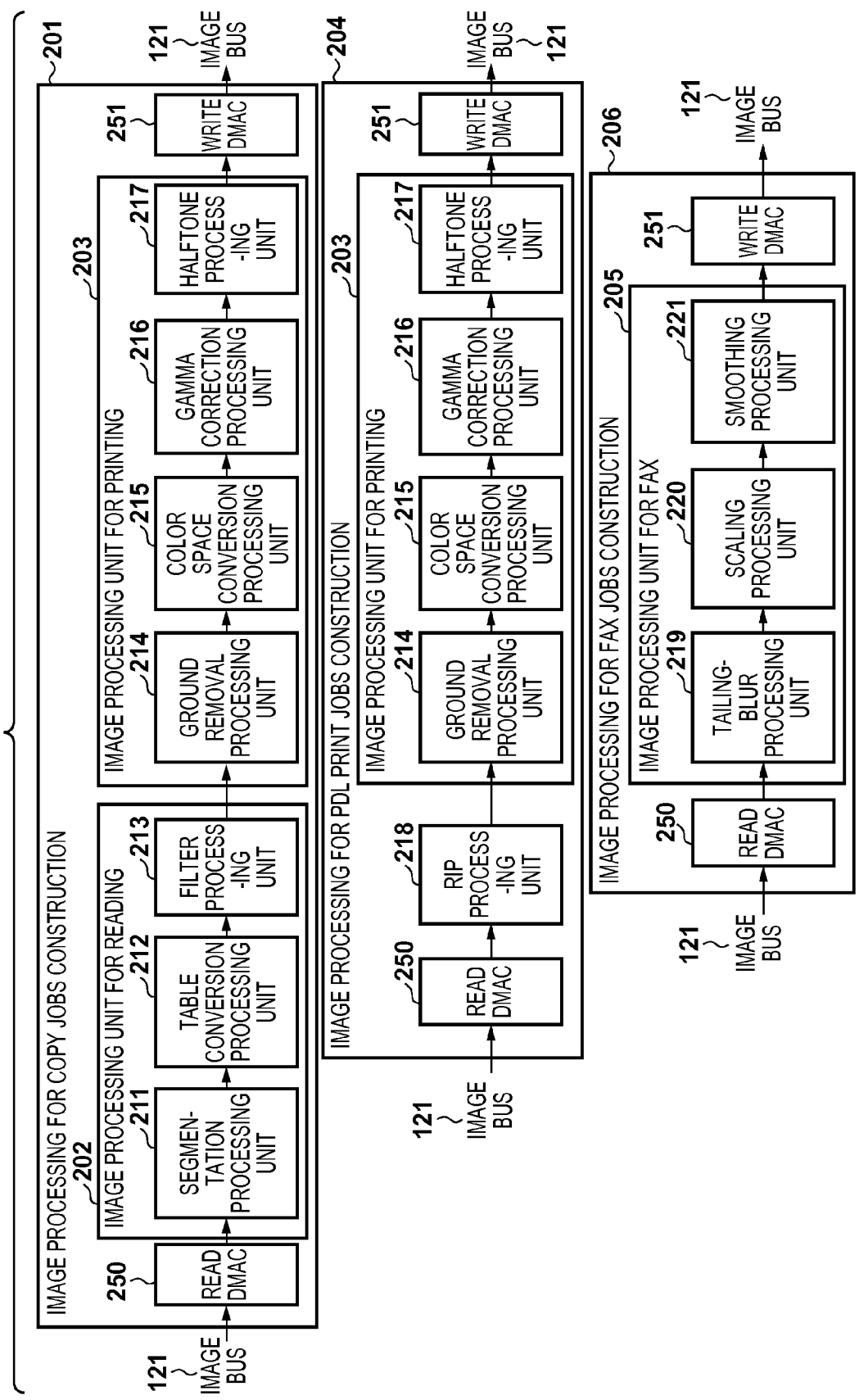
FIG. 2 is a view for showing a configuration of image processing capabilities comprised in a reconstruction unit according to the first embodiment.

In the present embodiment, image processing is executed by constructing the image processing capabilities explained using FIG. 2 in the reconstruction unit 131 as appropriate. Note that the jobs that the image processing apparatus 100 is capable of processing are not limited to those shown in FIG. 2. Also, regarding the units of the image processing, they need not be limited to those shown in FIG. 2, and it is possible to divide the processing included in each image process into even finer components.

Here, it is possible to construct the configuration data in the processing units as defined by the image processing for copy jobs construction 201, the image processing for PDL print jobs construction 204, and the image processing for FAX jobs construction 206. For example, explaining with the example of the image processing construction for copy jobs 201, configuration may be taken such that the image processing for copy jobs construction 201 is made to be configuration data that includes all of the read DMAC 250, the image processing unit for reading 202, the image processing unit for printing 203, and the write DMAC 251. Also, it is possible to prepare the read DMAC 250, the image processing unit for reading 202, the image processing unit for printing 203, and the write DMAC 251 as separate configuration data respectively. In a case where the configuration data are prepared separately, a circuit necessary for the execution of a copy job can be configured by partially reconstructing the above described separate respective configuration data items in the reconstruction unit 131 when executing a copy job. Of course, it is possible to prepare the configuration data in finer components. For example, it is possible to prepare a plurality of the filter processing units 213 each having differing filter schemes, and to, in accordance with a request, select the filter processing from configuration data of the plurality of the filter processing units 213 and use the filter processing when performing image processing for reading.

<Power Saving States>

Figure 3A:
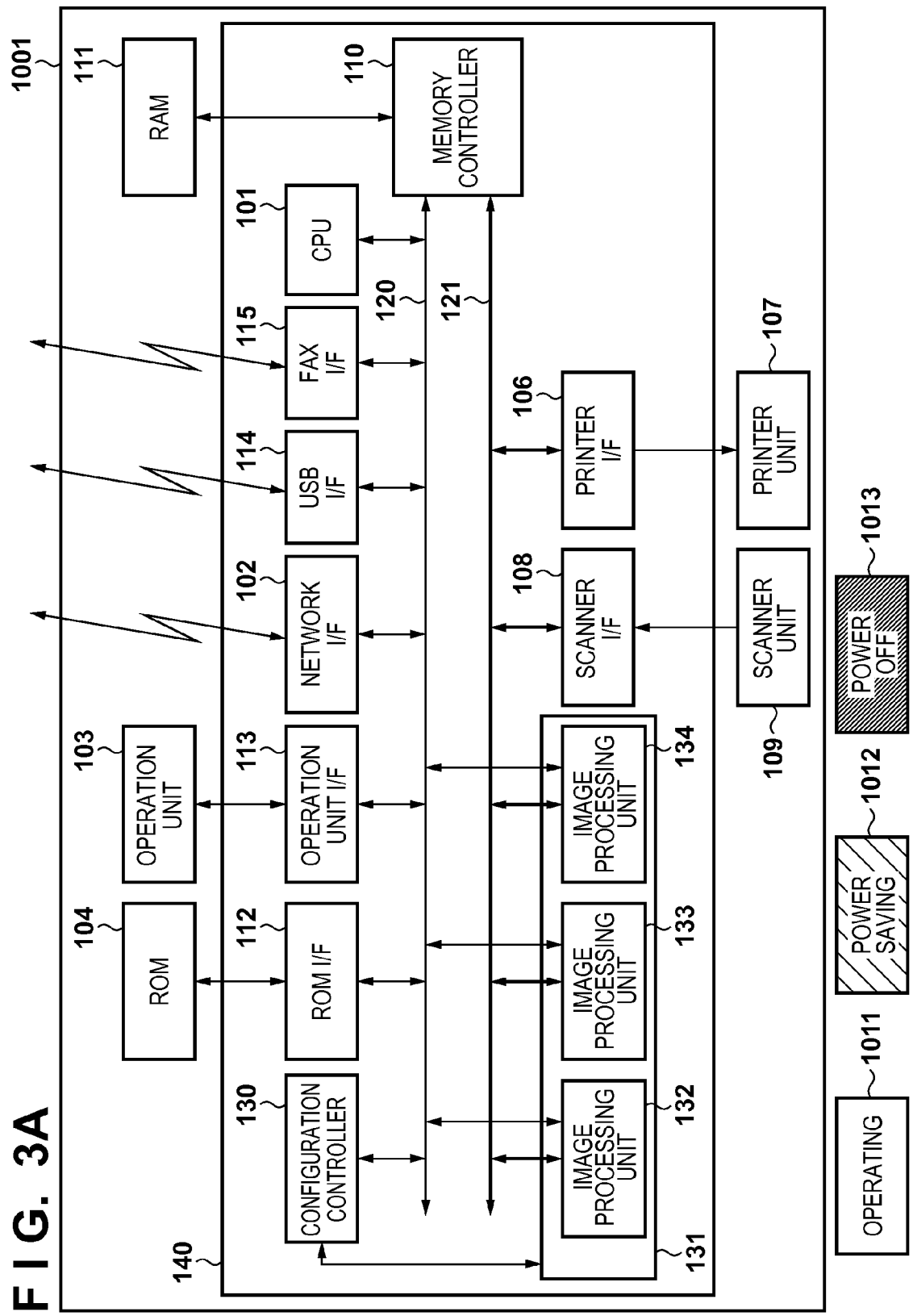
FIGS. 3A to 3C are a view for showing power saving states of the image processing apparatus according to a first embodiment.
Figure 3B:
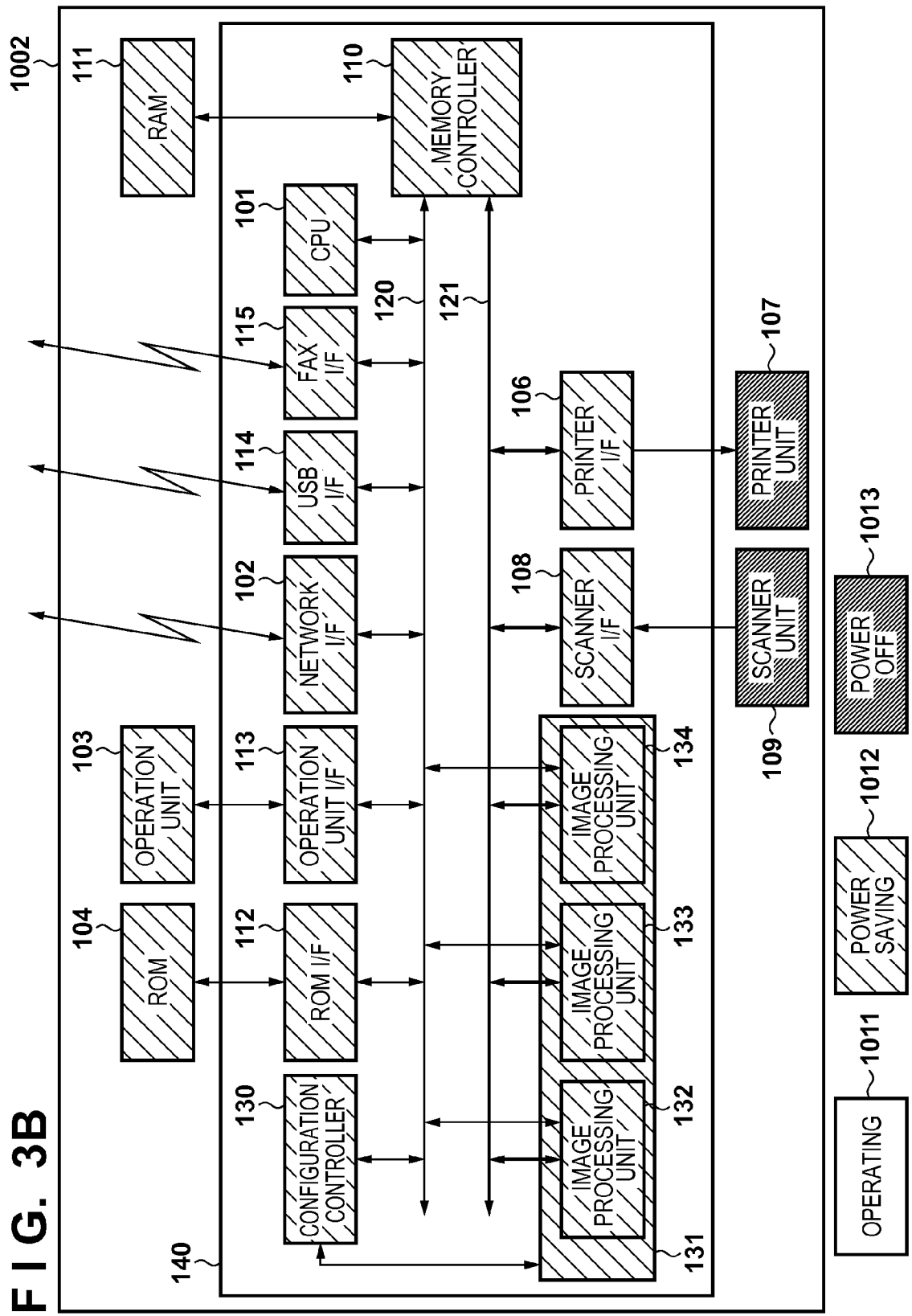
Figure 3C:
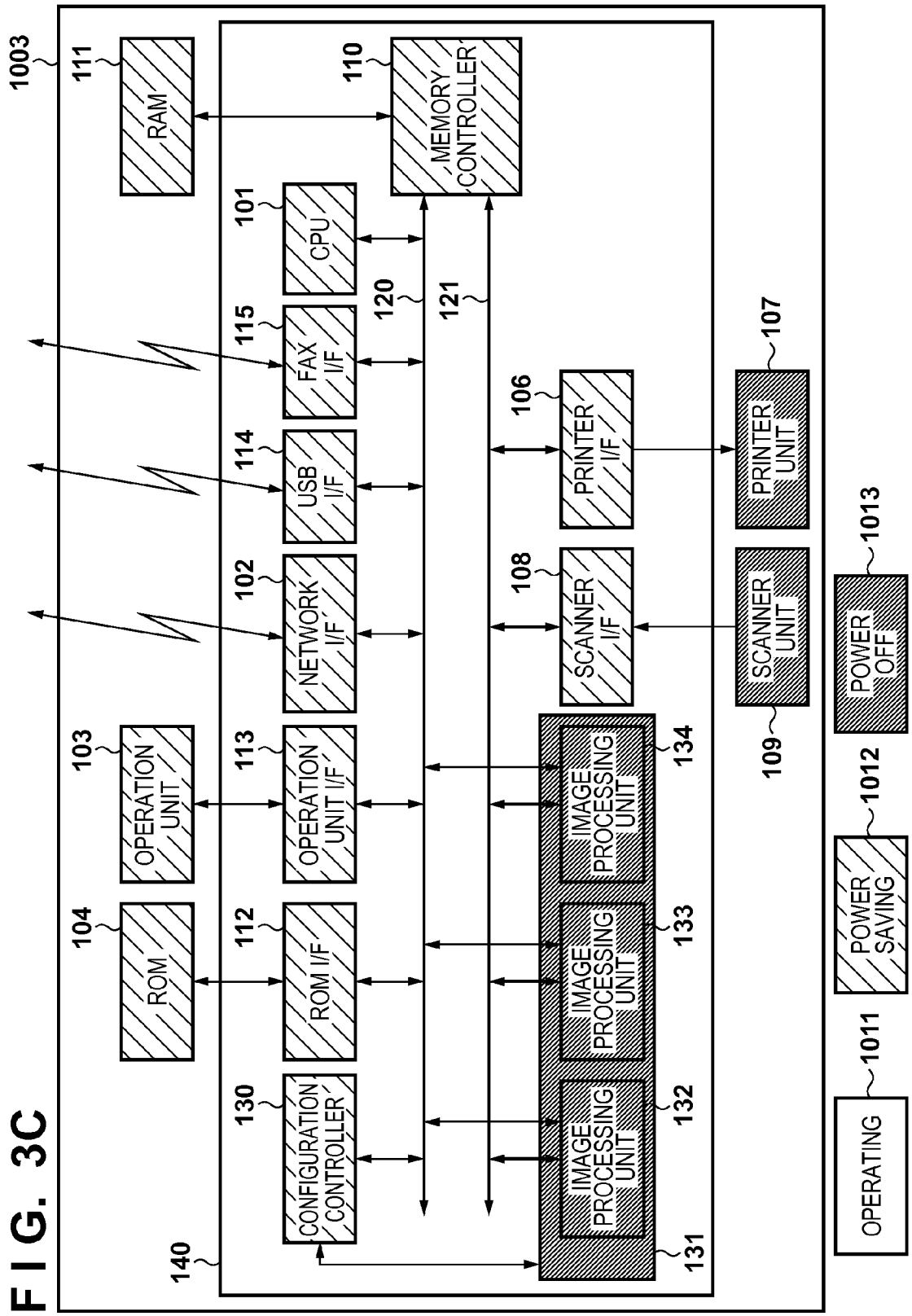

Next, with reference to FIGS. 3A to 3C, explanation will be given for states of power saving in the image processing apparatus 100 according to the present embodiment. Blocks similar to reference numeral 1011 are shown to be in an operable state in which a power supply and a clock are being supplied. Blocks similar to reference numeral 1012 are shown to be in a power saving state which is a state in which the power supply is turned on, but by clock-gating a portion of the functions are not operating, i.e. a state in which the supply of power is partially stopped. Blocks similar to reference numeral 1013 are shown to be in a state in which the power supply is turned OFF, and in which the power consumption is at its lowest.

Reference numeral 1001 denotes a state in which all functions of the image processing apparatus 100 are operable. Hereinafter, the state of reference numeral 1001 will be referred to as the normal mode.

Reference numerals 1002 and 1003 denote when the operation mode of the image processing apparatus 100 is in a power saving state. The difference between reference numerals 1002 and 1003 is whether the power supply of the reconstruction unit 131 is turned on or whether that power supply is turned OFF. In other words, it is shown that the state of reference numeral 1003 has lower power consumption than the state of reference numeral 1002. Hereinafter, the state of reference numeral 1002 will be referred to as the low-power mode, and the state of reference numeral 1003 will be referred to as the power saving mode. The low-power mode and the power saving mode will be referred to collectively as the energy saving mode.

The big difference between reference numerals 1002 and 1003 is whether the power supply is supplied to the reconstruction unit 131 or whether the supply of power is stopped. In the state of the low-power mode of reference numeral 1002, the circuit constructed in the reconstruction unit 131 does not disappear, but in the state of the power saving mode of reference numeral 1003, the circuit constructed in the reconstruction unit 131 disappears. For this reason, it is necessary to load the configuration data and construct the circuit in a case where it is desired that a function of the reconstruction unit 131 be used in order for the image processing apparatus 100 to perform some kind of processing when returning from the power saving mode. Also, even in the case of returning from the low-power mode, there is no need to reconstruct because the circuit that is constructed when recovering can be used as is, it is necessary to perform a reconstruction in a case where another circuit is required.

<Overall Sequence>

Next, with reference to FIG. 4, explanation will be given for a procedure for transitioning into the power saving mode, and a procedure for returning from the power saving mode for the image processing apparatus 100 according to the present embodiment. The processing explained below is realized by the CPU 101 reading a control program stored in the ROM 104 in advance into the RAM 111 and executing it. Because this flow is a flow that is common for all embodiments described below, explanation will be given for overall operation while considering the power state. Because the processing details change depending on the embodiment for step S101, step S103, and step S106, a detailed explanation will be omitted in this flow's explanation; details will be described in the explanation from FIGS. 5A to 5C.

In step S101, the CPU 101 operates in the normal mode, and is executing a job, for example a copy job or a print job. When the job is executed, the CPU 101 determines the job to execute, and the reconstruction unit 131 is reconfigured using the configuration data that is required for execution of the job. Here, reconfigure means to perform a configuration with separate configuration data in a state where configuration data is already constructed in the reconstruction unit 131. Hereinafter, this processing will be referred to as reconstruction (reconfiguration).

In step S102, the CPU 101 determines whether or not to transition into the energy saving mode. In a case where transition into the energy saving mode is detected, transition is made into step S103. Until this detection is made, the processing remains at step S102. For example, the detection that transition is made into the energy saving mode may be a detection of a timer event in a case where a predetermined amount of time elapses from when a job is finally executed, or it may be a detection of an operation event by a user operation on a button that indicates transition into the energy saving mode.

In step S103, the CPU 101 prior to transitioning to the energy saving mode, copies configuration data from the ROM 104 to the RAM 111 so that the reconstruction unit 131 can be constructed at high speed when returning from the energy saving mode. Also, configuration may be taken such that when configuration data can be constructed in advance in the reconstruction unit 131, prior to transitioning into the energy saving mode, the reconstruction unit 131 is configured. Control for selecting the configuration data will be explained later.

In step S104, the CPU 101 determines whether or not a trigger for return from the energy saving mode is received. If such a trigger is detected, the processing transitions to step S105. Until this detection is made, the processing remains at step S104. For example, this detection that the energy saving mode is to be returned from may be a detection of an operation event by a user operation on a button indicating the return from the energy saving mode, or a detection of a reception of a job from an external apparatus via the network I/F 102.

In step S105, the CPU 101 returns from the energy saving mode into the normal mode. In detail, transition is made from a state of reference numerals 1002 or 1003 of FIGS. 3B and 3C to the state of reference numeral 1001. Continuing on, in step S106, the CPU 101 confirms the reason for return from the energy saving mode, and performs a construction of the configuration data required for execution of the job corresponding to the return reason in the reconstruction unit 131. Furthermore, the CPU 101 executes the corresponding job because the required image processing circuit has been written in the reconstruction unit 131 in step S106, and the processing completes.

<Configuration Data and Reconstruction Unit Circuit State Example 1>

Next, with reference to FIGS. 5A to 5C, explanation will be given for configuration data storage control for the image processing apparatus 100 according to the present embodiment, and the state of the image processing circuit comprised in the reconstruction unit 131.

Firstly, explanation will be given for a presupposition of the explanation of the present embodiment. In a case where the in-operation configuration data is stored in the ROM 104 in the normal mode, and a reconstruction is performed, the required configuration data is read from the ROM 104 and construction in the reconstruction unit 131 is performed. The energy saving mode is a power saving mode, and because the power supply of the reconstruction unit 131 is turned OFF, the circuit constructed in the reconstruction unit 131 disappears when the power saving mode is transitioned into. Also, one of the image processing for copy jobs construction 201, the image processing for PDL print jobs construction 204, and the image processing for FAX jobs construction 206 shown in FIG. 2 is prepared as the configuration data.

According to the present embodiment, when the power saving mode is transitioned into, priority configuration data is copied from the ROM 104 to the RAM 111. Then, it is confirmed whether configuration data corresponding to the reason for return is in the RAM 111 when the power saving mode is returned from, and if the data is in the RAM 111, the configuration data is read from the RAM and the construction is performed. By using this technique, it becomes possible to return from the power saving mode at high speed compared to cases in which the configuration data is read from the ROM 104 because it is possible to configure such that the configuration data is read at high speed when reading from the RAM 111. In other words, here, by storing (writing) the priority configuration data in the memory that has the comparatively faster reading speed, the processing upon return is optimized.

Here, the priority configuration data is configuration data of an image processing unit having a high possibility of being used. For example, it is possible to designate the priority configuration data by making an instruction from the operation unit 103. Also, as another way to designate the priority configuration data, it is possible to designate configuration data for a copy job or a print job as the priority configuration data in a case where the copy job or PDL print job frequency is high. Of course it is possible to designate a function used frequently as the priority configuration data in the case where the configuration data function is prepared in finer components.

Additionally, it is possible to copy all of the configuration data into the RAM 111 but the RAM 111 has a limit capacity, and while the present embodiment is explained with only three configuration data items, an actual image processing apparatus is not limited to three, and so this is not realistic. In particular, in a case in which a partial reconstruction is performed, there is a possibility that the number of configuration data items will become huge, and it will be difficult to copy all of the configuration data into the RAM 111. Thus, priority configuration data is necessary.

Figure 5A:
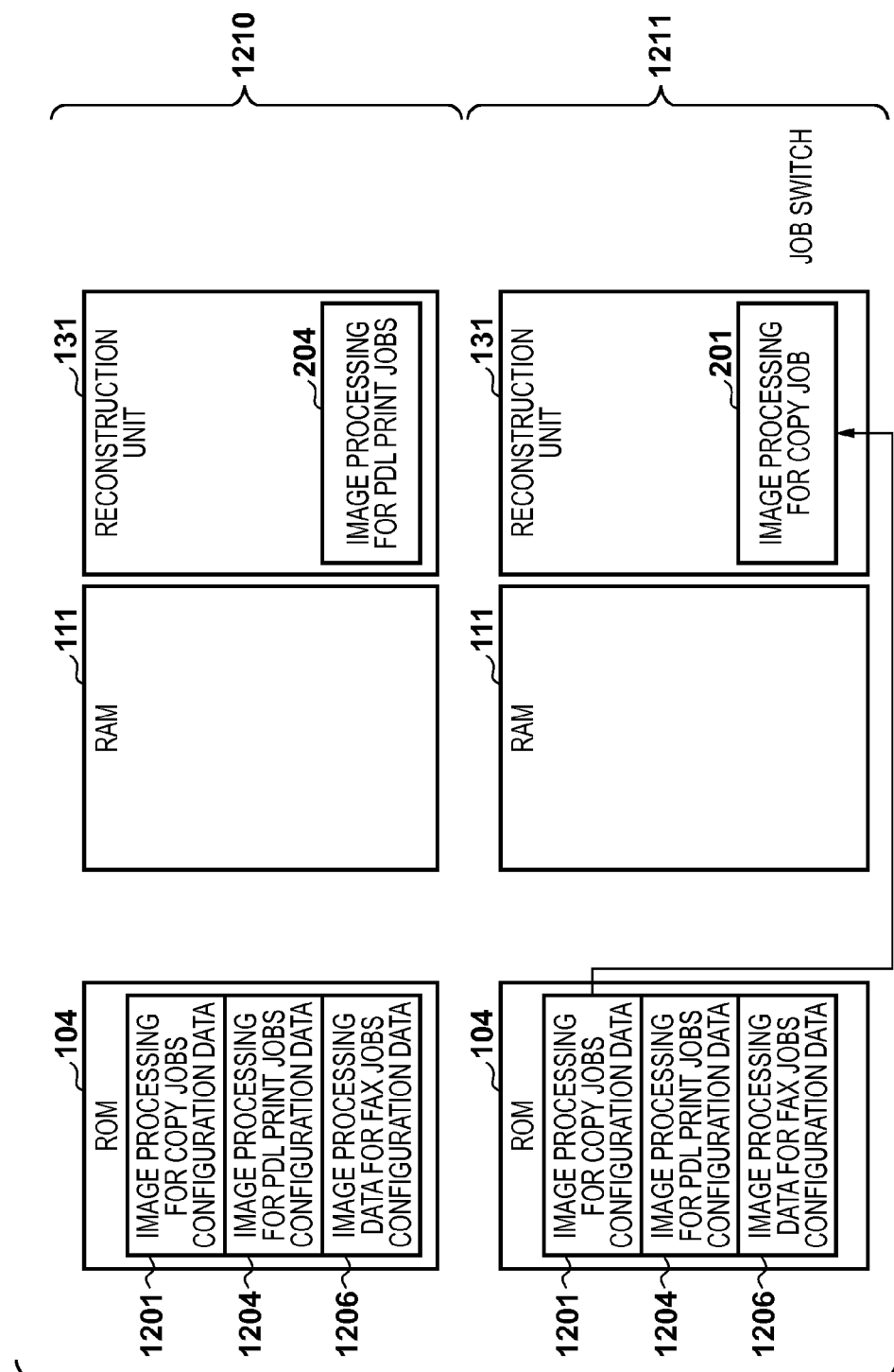
Figure 5B:
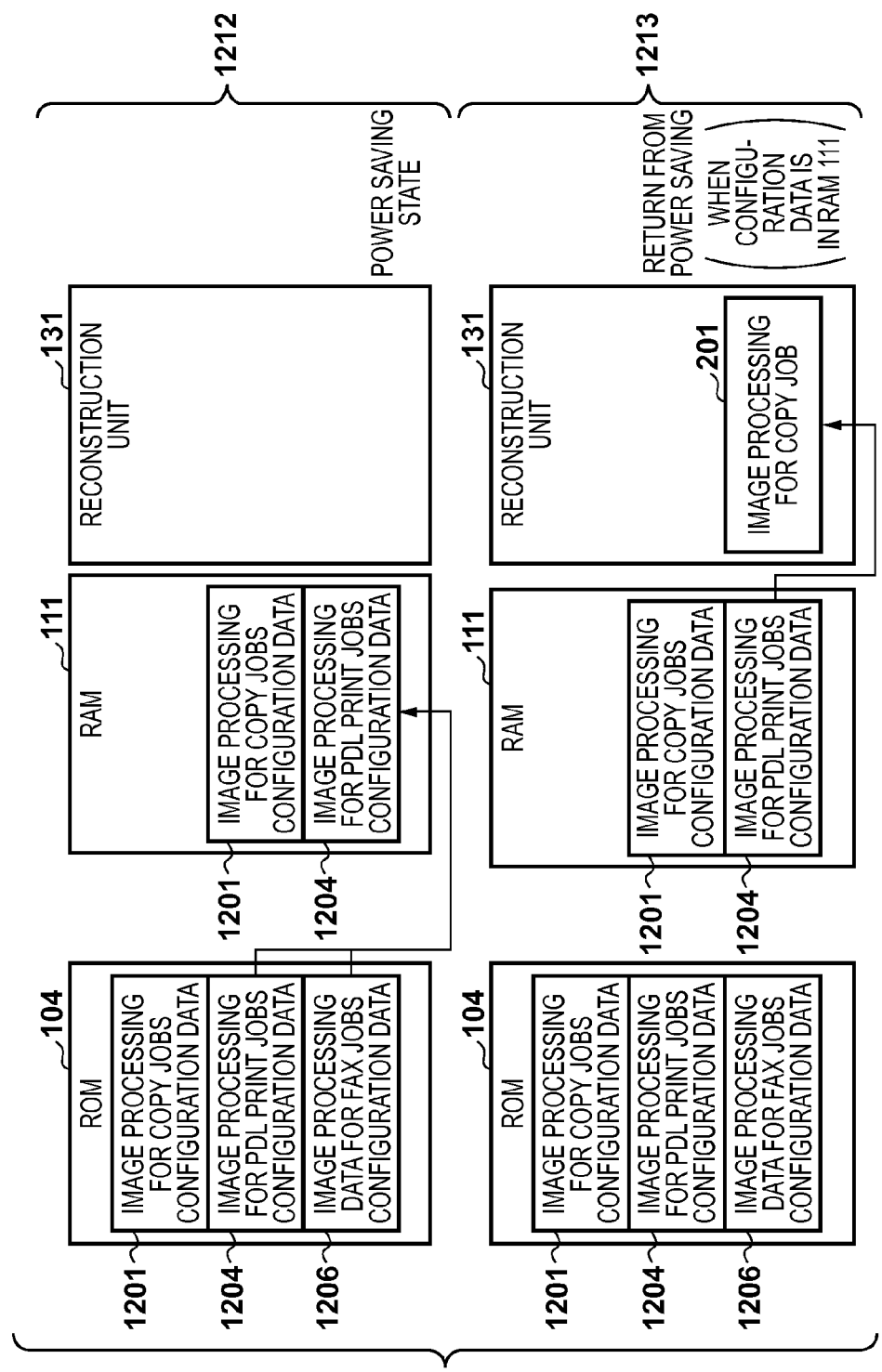

Image processing for copy jobs configuration data 1201 recited in FIGS. 5A to 5C is configuration data for the image processing for copy jobs construction 201. Image processing for PDL print jobs configuration data 1204 is configuration data for the image processing for PDL print jobs construction 204. Image processing for FAX jobs configuration data 1206 is configuration data for the image processing for FAX jobs construction 206. The configuration data 1201, 1204 and 1206 is stored in the ROM 104, and upon transition into the power saving mode, the priority configuration data is copied into the RAM 111. In the present embodiment, explanation is given with image processing for copy jobs configuration data 1201 and image processing for PDL print jobs configuration data 1204 as the priority configuration data.

Reference numerals 1210 and 1211 in FIG. 5A are examples of configuration data and the image processing circuit in the reconstruction unit 131 when operating in the normal mode of step S101 of FIG. 4. Reference numeral 1210 denotes a state where a PDL print job is executed. The image processing for PDL print jobs configuration data 1204 is constructed, and thereby the image processing for PDL print jobs construction 204 is constructed in the reconstruction unit 131. In reference numeral 1211, it is detected that a copy job is executed after the completion of the PDL print job, and the image processing for copy jobs configuration data 1201 is constructed, and thereby the image processing for copy jobs construction 201 is constructed in the reconstruction unit 131.

Reference numeral 1212 denotes an example of configuration data and an image processing circuit of the reconstruction unit 131 in a case where a transition is made into the power saving mode in step S103 of FIG. 4. When it is detected that the transition is made into the power saving mode, the image processing for copy jobs configuration data 1201 and the image processing for PDL print jobs configuration data 1204 are copied from the ROM 104 into the RAM 111. Also, because the power supply of the reconstruction unit 131 is turned OFF, the image processing circuit has disappeared.

Reference numerals 1213 and 1214 denote examples of configuration data and an image processing circuit of the reconstruction unit 131 in cases where return from the power saving mode is performed in step S106 of FIG. 4. In reference numeral 1213, because after return from sleep, the job to be executed is a copy job, and the image processing for copy jobs configuration data 1201 is in the RAM 111, reconstruction of the reconstruction unit 131 is performed by reading from the RAM 111 rather than the ROM 104. On the other hand, in reference numeral 1214, after return from sleep, the job to be executed is a FAX job, and so it is desired that image processing for FAX jobs configuration data 1206 be read from the RAM 111, but the image processing configuration data for FAX jobs 1206 was not copied into the RAM 111. Thus, the image processing for FAX jobs configuration data 1206 is read from the ROM 104 and the construction of the reconstruction unit 131 is performed. Compared to reference numeral 1214, reading of the configuration data in reference numeral 1213 is faster, and so it is possible to reduce the time period for return from the power saving mode.

<Normal Processing Control Flow 1>

Figure 6:
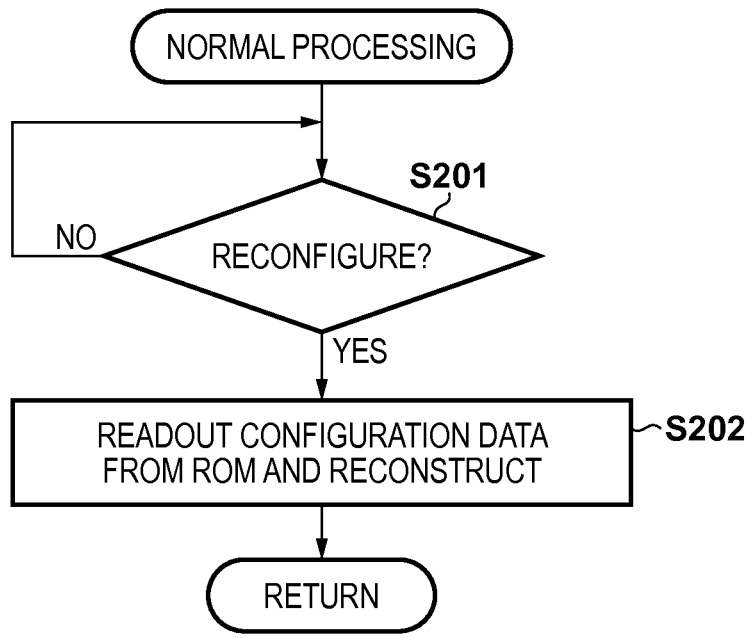
FIG. 6 is a flowchart for showing an overall control flow upon normal processing according to the first embodiment.

Next, with reference to FIG. 6, explanation will be given for a detailed processing procedure for step S101 of FIG. 4. The processing explained below is realized by the CPU 101 reading a control program stored in the ROM 104 in advance into the RAM 111 and executing it.

In step S201, the CPU 101 determines whether or not a reconstruction is necessary during normal processing. In a case where a reconstruction is not necessary, the processing remains in step S201 as is, and in a case where the reconstruction is necessary, transition is made to step S202. The determination as to whether a reconstruction is necessary determines the job to be executed, and determines whether or not a circuit that is different from the circuit currently configured in the reconstruction unit 131 is necessary.

In step S202, the CPU 101 reads out the necessary configuration data from the ROM 104, performs the reconstruction of the reconstruction unit 131, and completes the processing. Though not shown in the flow, a job is executed after step S202. Using reference numerals 1210 and 1211 of FIG. 5A to explain, there is no need to reconstruct during processing of the PDL print job in reference numeral 1210, but in a case where the copy job is executed in reference numeral 1211, because the image processing for copy jobs construction 201 is necessary, a reconstruction into the reconstruction unit 131 is performed.

<Control Flow 1 when Transitioning into the Power Saving Mode>

Figure 7:
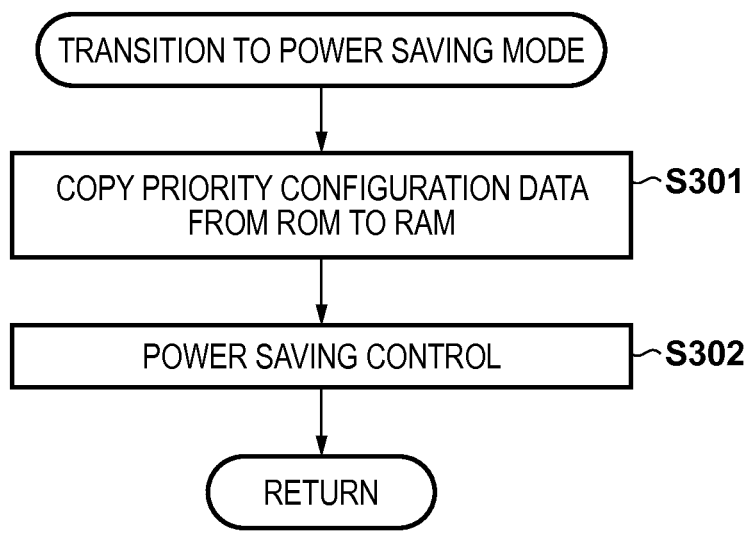
FIG. 7 is a flowchart for showing a control flow upon transition into a power saving mode according to the first embodiment.

Next, with reference to FIG. 7, explanation will be given for a detailed processing procedure for step S103 of FIG. 4. The processing explained below is realized by the CPU 101 reading a control program stored in the ROM 104 in advance into the RAM 111 and executing it.

In step S301, the CPU 101 copies configuration data designated to be the priority configuration data from the ROM 104 to the RAM 111. In step S302, the CPU 101 controls the power supply of each function to be OFF in order to transition into the power saving mode, and disables a portion of the functions by clock-gating; also the power saving mode is transitioned into, and the processing completes. Explaining using reference numeral 1212 of FIG. 5B, the image processing for copy jobs configuration data 1201 and the image processing for PDL print jobs configuration data 1204, which are the priority configuration data, are copied from the ROM 104 into the RAM 111.

<Control Flow 1 when Returning from the Power Saving Mode>

Figure 8:
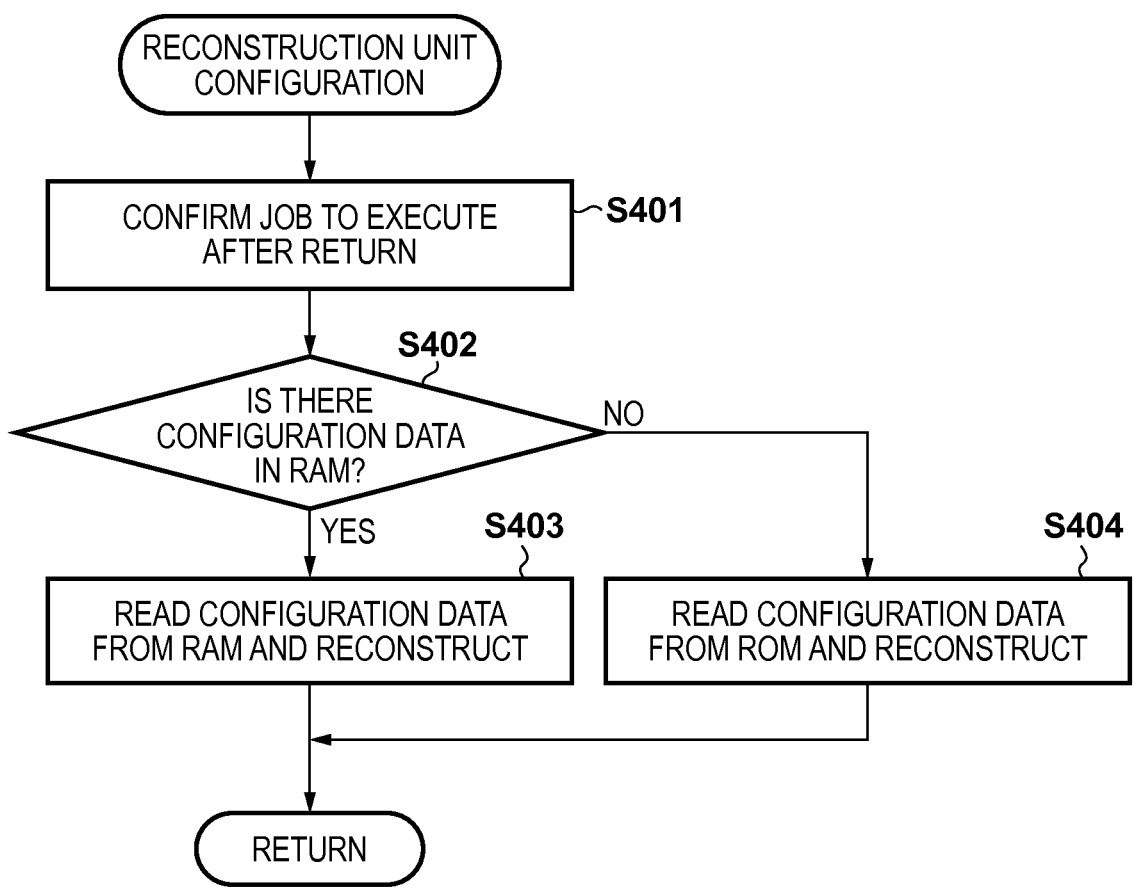
FIG. 8 is a flowchart for showing a control flow upon return from the power saving mode according to the first embodiment.

Next, with reference to FIG. 8, explanation will be given for a detailed processing procedure for step S106 of FIG. 4. The processing explained below is realized by the CPU 101 reading a control program stored in the ROM 104 in advance into the RAM 111 and executing it.

In step S401, the CPU 101 confirms a job to be executed after the return from the power saving mode. Continuing on, in step S402, the CPU 101 determines whether or not the configuration data corresponding to the image processing circuit required to execute the job confirmed in step S401 is stored in the RAM 111. In a case where the required configuration data is in the RAM 111, transition is made to step S403, and in a case where the required configuration data is not in the RAM 111, transition is made to step S404.

In step S403, the CPU 101 reads out the necessary configuration data from the RAM 111, performs the reconstruction of the reconstruction unit 131. In step S404, because the required configuration data is not in the RAM 111, the CPU 101 reads the required configuration data from the ROM 104, and performs the reconstruction of the reconstruction unit 131.

Explaining using reference numerals 1213 and 1214 of FIGS. 5B and 5C, in reference numeral 1213, because there is the image processing for copy jobs configuration data 1201 in the RAM 111 in step S402, transition is made step S403, and reading from the RAM 111 is performed. In the case of reference numeral 1214, because the image processing for FAX jobs configuration data 1206 is not in the RAM 111 in step S402, transition is made to step S404, and reading from the ROM 104 is performed.

As explained above, the image processing apparatus 100 of the present embodiment is provided with the reconstruction unit 131, which is capable of reconstruction of a functional block for performing image processing, and the ROM 104, which stores in advance configuration data for each of a plurality of functional blocks in order to construct the functional blocks in the reconstruction unit 131. In addition, the image processing apparatus 100 is provided with the RAM 111, which has a faster reading speed as compared with the ROM 104 and for which reading/writing is possible. The image processing apparatus 100, prior to transitioning into the power saving mode, for example, reads out from the ROM 104 the configuration data of the functional block having the highest possibility of being required next, and writes that block into the RAM 111. In addition, when the reconstruction of the reconstruction unit 131 is required, the image processing apparatus 100 reconstructs the reconstruction unit 131 reading out the necessary configuration data from the RAM 111. In this way, by virtue of the present embodiment, it is possible to reduce the time period for return from the power saving mode by copying the configuration data into a memory (the RAM 111) that is capable of being read at high speed prior to transitioning into the power saving mode.

Second Embodiment

Below, with reference to FIGS. 9A to 9C through FIG. 12 explanation will be given for a second embodiment of the present invention. Firstly, explanation will be given for a difference in the presupposition to the above described first embodiment. This is that in the present embodiment, the construction of the reconstruction unit 131 is always performed reading the configuration data from the RAM 111. In other words, in the present embodiment, the configuration data in operation in the normal mode is not constructed by reading configuration data stored in the ROM 104, but rather is constructed by reading configuration data copied into the RAM 111. In a case where the reconstruction unit 131 is reconstructed, when the configuration data is not in the RAM 111, first the configuration data is copied from the ROM 104 to the RAM 111, and then the configuration data is read from the RAM 111 and constructed. Of course, because there is a limit to the capacity of the RAM 111, there is a limit to how much configuration data it is possible to copy, and the number of configuration data items that can be copied into the RAM 111 is limited by the number of configuration data items and the size of the configuration data.

<Configuration Data and Reconstruction Unit Circuit State Example 2>

First, with reference to FIGS. 9A to 9C, explanation will be given for configuration data storage control for the image processing apparatus 100 according to the present embodiment, and the state of the image processing circuit comprised in the reconstruction unit 131. The configuration of FIGS. 9A to 9C and the definitions of the terms is the same as the explanation of FIGS. 5A to 5C in the above described first embodiment, and so the explanation will be omitted. The difference with FIGS. 5A to 5C is the point that the configuration data constructed in the reconstruction unit 131 is always copied into the RAM 111 in the normal mode. As a premise of the explanation of FIGS. 9A to 9C, an example in which there are two pieces of configuration data that can be copied into the RAM 111 will be explained.

Figure 9A:
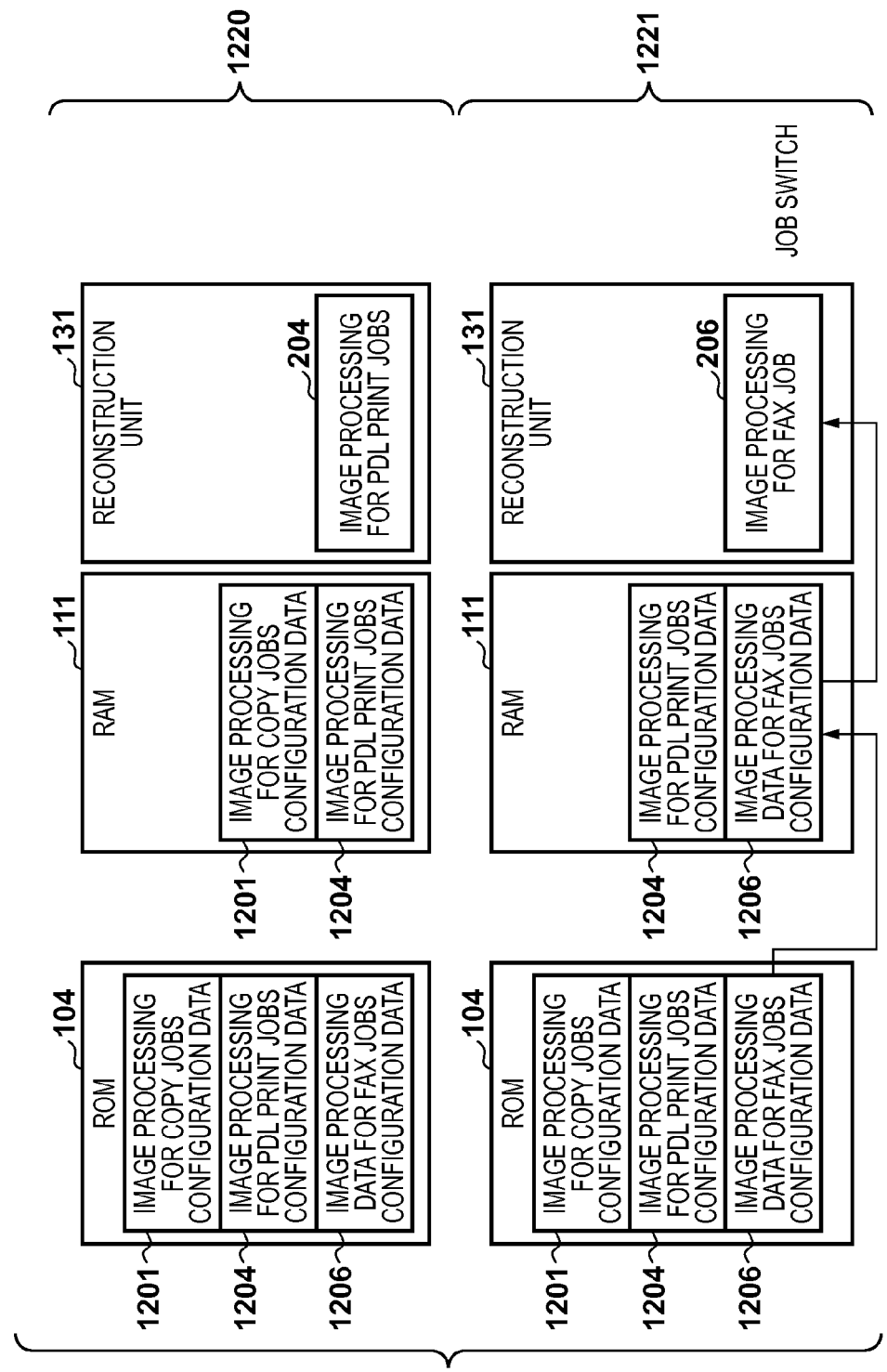
Figure 9B:
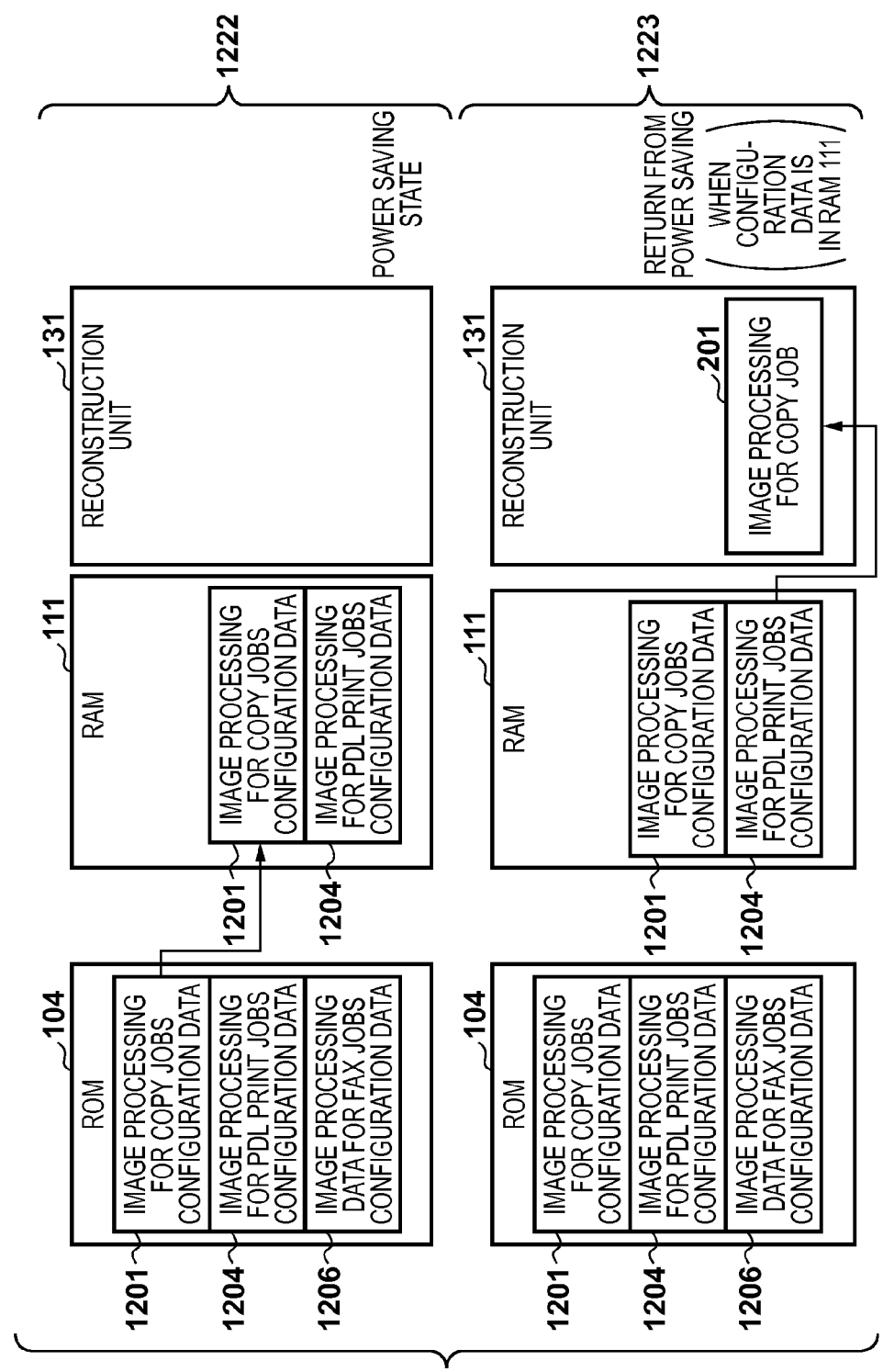

Reference numerals 1220 and 1221 in FIG. 9A are examples of configuration data and the image processing circuits in the reconstruction unit 131 when operating in the normal mode of step S101 of FIG. 4. Reference numeral 1220 denotes a state where the PDL print job is executed. The image processing for PDL print jobs configuration data 1204 is constructed, and thereby the image processing for PDL print jobs construction 204 is constructed in the reconstruction unit 131. In addition, the image processing for copy jobs configuration data 1201 and the image processing for PDL print jobs configuration data 1204 are stored in the RAM 111. These show examples for when prior to execution of a PDL print job a copy job is executed, and then next the PDL print job is executed. In the second embodiment, the configuration data constructed in the reconstruction unit 131 is always first copied from the ROM 104 into the RAM 111.

For reference numeral 1221, it is detected that a FAX job is executed after the completion of the PDL print job, the image processing for FAX jobs configuration data 1206 is constructed, and thereby the image processing for FAX jobs construction 206 is constructed in the reconstruction unit 131. In detail, because, when the execution of a FAX job is detected, the image processing for FAX jobs configuration data 1206 is not in the RAM 111 which is capable of being read at high speed, firstly, the image processing for FAX jobs configuration data 1206 is copied from the ROM 104 to the RAM 111. Upon copying to the RAM 111, because only two configuration data items can be stored (written) in the RAM 111, control is performed so as to delete the configuration data with the older history of being used in the present embodiment. In other words, the image processing for FAX jobs configuration data 1206 is copied into a region of the image processing for copy jobs configuration data 1201 in the RAM 111. This processing is only one example, and another control approach such as controlling to as to set in advance the configuration data desired to be left preferentially in the RAM 111 and to overwrite a region in which other configuration data is stored can be used. Next, the image processing for FAX jobs configuration data 1206 is read from the RAM 111 and the construction of the reconstruction unit 131 is performed.

Reference numeral 1222 denotes an example of the configuration data and the image processing circuit of the reconstruction unit 131 in a case where in step S103 of FIG. 4 the power saving mode is transitioned into. When it is detected that transition is made into the power saving mode, the image processing for copy jobs configuration data 1201 and the image processing for PDL print jobs configuration data 1204 are copied from the ROM 104 into the RAM 111. Here, because the image processing for PDL print jobs configuration data 1204 is previously copied into the RAM 111, only the image processing for copy jobs configuration data 1201 is actually copied. However, similarly to the explanation of reference numeral 1212 of FIG. 5B, it is possible to copy all of the priority configuration data into the RAM 111, the copy time can be reduced by reducing the configuration data that is copied, and the time required to transition into the power saving mode can be reduced. Also, because the power supply of the reconstruction unit 131 is turned OFF, the image processing circuit has disappeared.

Reference numeral 1223 and 1224 denote examples of configuration data and an image processing circuit of the reconstruction unit 131 in a case where return from the power saving mode is performed in step S106 of FIG. 4. In reference numeral 1223, because it is detected that after return from sleep, the job to be executed is a copy job, and the image processing for copy jobs configuration data 1201 is in the RAM 111, construction of the reconstruction unit 131 is performed by reading from the RAM 111 rather than the ROM 104. In reference numeral 1224, it is detected that, after return from sleep, the job to be executed is a FAX job, and so it is desired that the image processing for FAX jobs configuration data 1206 be read from the RAM, but the image processing configuration data for FAX jobs 1206 is not copied into the RAM 111. Thus, the image processing for FAX jobs configuration data 1206 is read from the ROM 104 and the construction of the reconstruction unit 131 is performed similarly to as explained in reference numeral 1223.

<Normal Processing Control Flow 2>

Figure 10:
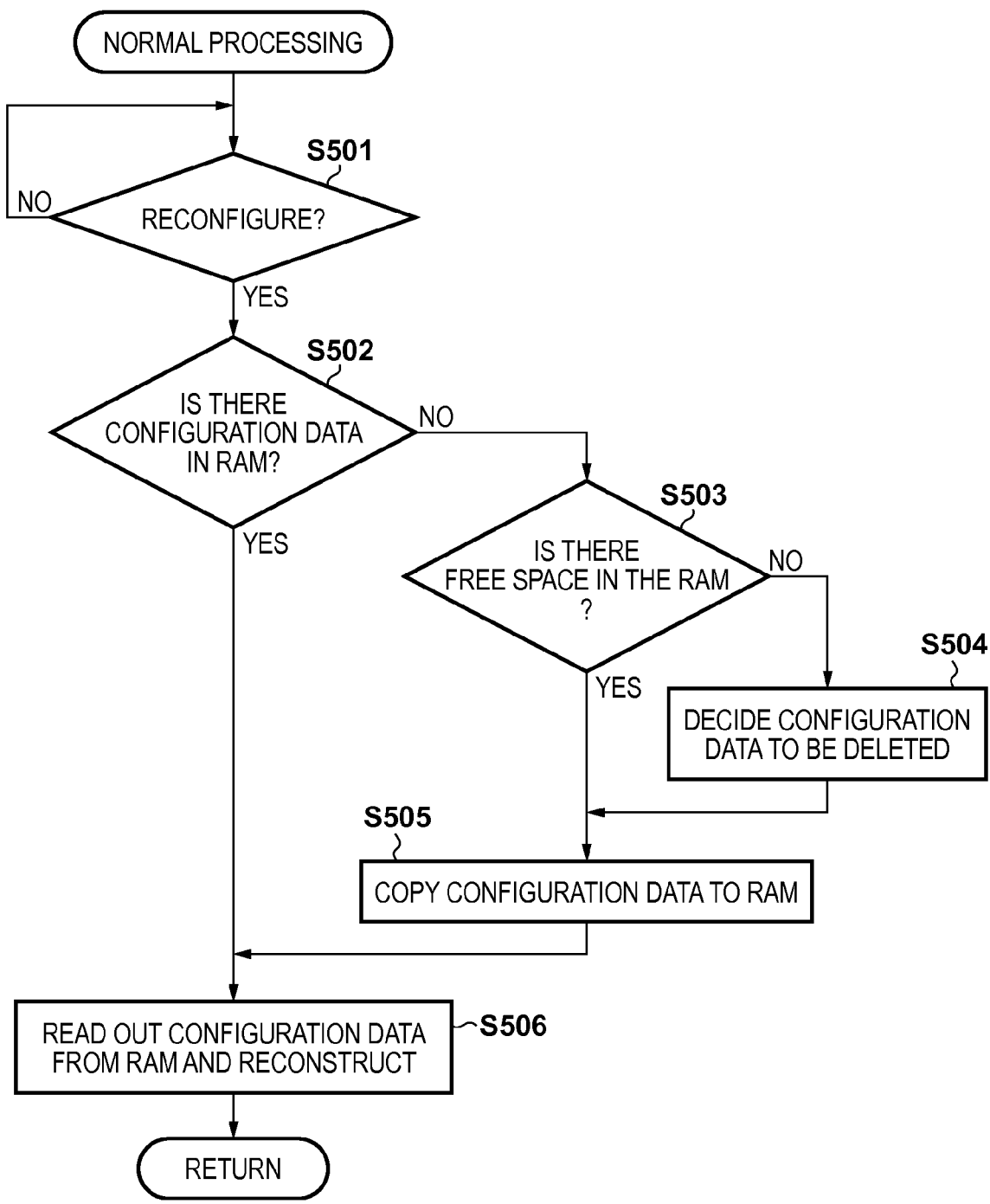
FIG. 10 is a flowchart for showing a control flow upon transition into a power saving mode according to the second embodiment.

Next, with reference to FIG. 10, explanation will be given for a detailed processing procedure for step S101 of FIG. 4. The processing explained below is realized by the CPU 101 reading a control program stored in the ROM 104 in advance into the RAM 111 and executing it.

In step S501, the CPU 101 determines whether or not a reconstruction is required. In a case where the reconstruction is required, the processing remains in step S501 as is. In a case where the reconstruction is required, the processing transitions to step S502. In step S502, the CPU 101 determines whether or not the required configuration data is in the RAM 111, and in the case where the configuration data is in the RAM 111, transition is made to step S506, but in the case where the configuration data is not in the RAM 111, transition is made to step S503.

In step S503, because it is necessary to copy the configuration data into the RAM 111, the CPU 101 determines whether or not there is free space to copy the configuration data in the RAM 111. In the case where there is free space, transition is made to step S505, and in the case where there is no free space, transition is made to step S504.

In step S504, the CPU 101 determines the configuration data to delete from the configuration data stored in the RAM 111. In step S505, regardless of whether the CPU 101 transitions from step S503 or transitions from step S504, because the region of the RAM 111 to which to write the configuration data is clear, the configuration data is copied from the ROM 104 to the RAM 111.

In step S506, regardless of whether transition is made from step S502 or transition is made from step S505, the CPU 101 reads the configuration data in the RAM 111, the required configuration data is read from the RAM 111, and the reconstruction of the reconstruction unit 131 is performed.

Explanation will be given for processing in the case where transition is made from reference numeral 1220 to reference numeral 1221 using reference numerals 1220 and 1221 of FIG. 9A and the flowchart of FIG. 10. In reference numeral 1220, there need not be a reconstruction of the PDL print job currently being processed, but in reference numeral 1221 a FAX job is executed, and the image processing for FAX jobs construction 206 becomes required in the reconstruction unit 131, and so a reconstruction is performed. In the flowchart of FIG. 10, transition is made into step S502, step S503, and step S504, the configuration data to be deleted is determined to be the image processing for copy jobs configuration data 1201, and in step S505 the image processing for FAX jobs configuration data 1206 is copied into the RAM 111. Next, in step S506, the image processing for FAX jobs configuration data 1206 copied into the RAM 111 is read, constructed in the reconstruction unit 131, and thereby the image processing for FAX jobs construction 206 is constructed.

If the job executed in reference numeral 1221 is a copy job, the configuration data stored in the RAM 111 is in the state shown in reference numeral 1220, and transition is made from step S502 to step S506. In step S506, the image processing for copy jobs configuration data 1201 is read from the RAM 111, constructed in the reconstruction unit 131, and thereby the image processing for copy jobs construction 201 is constructed.

<Control Flow 2 when Transitioning into the Power Saving Mode>

Figure 11:
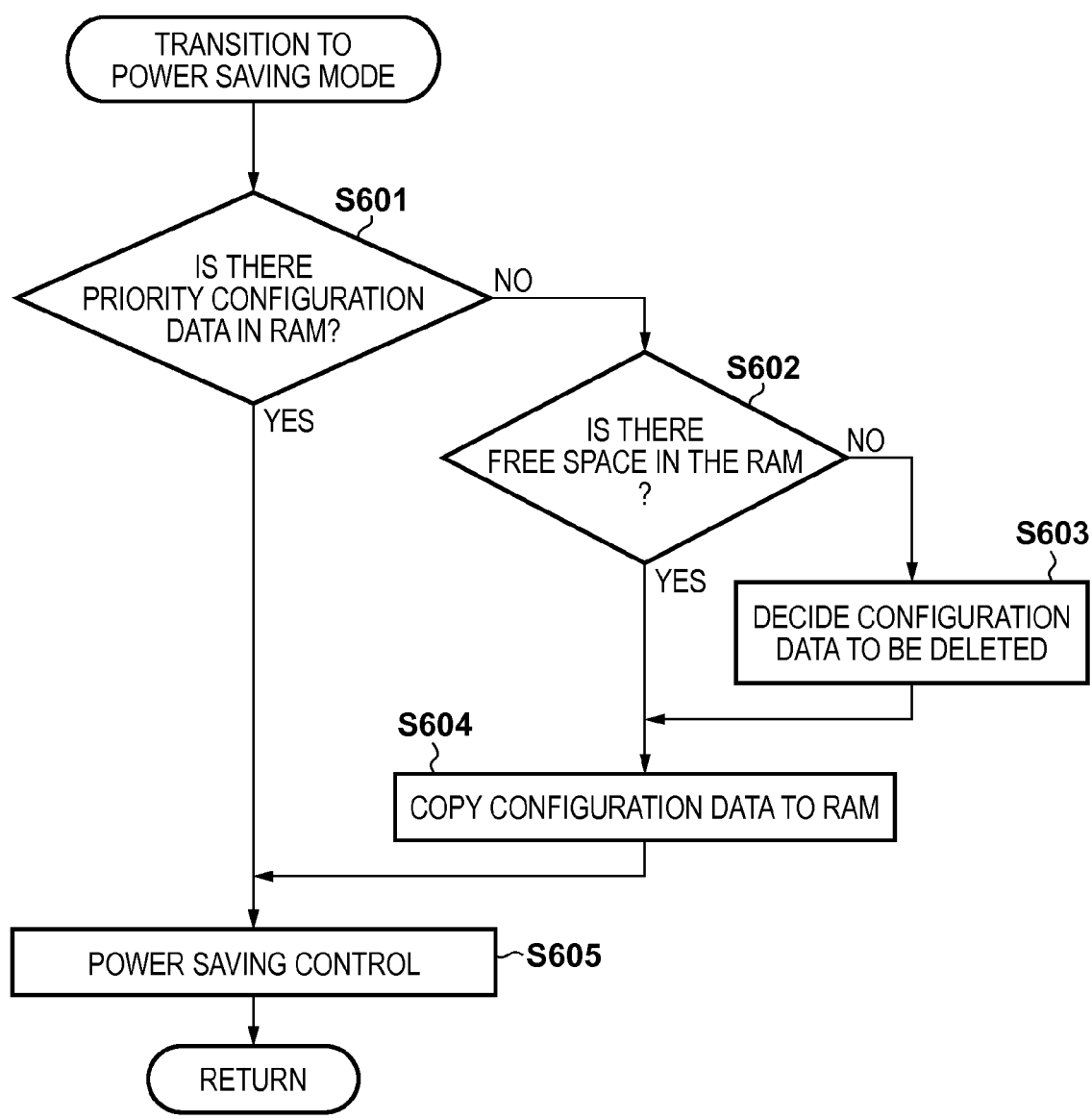
FIG. 11 is a flowchart for showing a control flow upon transition into a power saving mode according to the second embodiment.

Next, with reference to FIG. 11, explanation will be given for a detailed processing procedure for step S103 of FIG. 4. The processing explained below is realized by the CPU 101 reading a control program stored in the ROM 104 in advance into the RAM 111 and executing it.

In step S601, the CPU 101 determines whether or not there is priority configuration data in the RAM 111. In a case where the priority configuration data is in the RAM 111, transition is made to step S605, and in a case where the priority configuration data is not in the RAM 111, transition is made to step S602. Step S602 and step S604 are processing similar to step S503 and step S505 of FIG. 10, and explanation is omitted. However, in step S603, the processing for determining which configuration data to delete is the same as step S504, but configuration data other than the configuration data designated for the priority configuration data is always deleted. In other words, here, the configuration data of the functional block that has a low possibility of being required next is deleted. In step S605, the CPU 101 controls the power supply of each function to be OFF in order to transition into the power saving mode, disables a portion of the functions by clock-gating, the power saving mode is transitioned into.

Explanation will be given for the concrete processing using reference numerals 1221 and 1222 of FIG. 9A and the flowchart of FIG. 10. In the state of reference numeral 1221, the image processing for PDL print jobs configuration data 1204 which is the priority configuration data is stored in the RAM 111, but the image processing for copy jobs configuration data 1201 is not stored. Accordingly, because the priority configuration data stored in the RAM 111 is insufficient, the processing branches from step S601 to step S602. Because the RAM region in which to store the configuration data in the RAM 111 is empty in step S602, transition is made to step S603. In step S603, the configuration data to be deleted is determined to be configuration data other than the priority configuration data. In the state of reference numeral 1221, the image processing for FAX jobs configuration data 1206, which is not the priority configuration data is determined. In step S604, the image processing for copy jobs configuration data 1201 is copied to the RAM 111, and the state becomes as in reference numeral 1222.

Here, for example, in the case that a capacity at which it is possible to store the configuration data is larger than the capacity to store all of the priority configuration data, configuration data other than the priority configuration data remains in the RAM 111 after processing in step S604 is complete. Because of this when returning from power saving mode, the possibility that there is required configuration data in the RAM 111 is higher.

<Control Flow 2 During the Return Power Saving Mode>

Next, with reference to FIG. 12, a detailed processing procedure for step S106 of FIG. 4 will be shown. Additionally, since the processes in step S701, step S702 and step S706 are the same as the processes in step S401, step S402, and step S403 of FIG. 8, an explanation of these will be omitted. Also, since the processes in step S703 through step S705 are the same as the processes in step S503 through step S505 in FIG. 10, an explanation of these will be omitted.

As explained above, by virtue of the present embodiment, it is possible to optimize a construction of the reconstruction unit 131 upon normal operation while shortening a time period for return from the power saving mode. Also, in the case that there is a limit on the capacity of configuration data storable to a memory that is capable of being read at high speed (the RAM 111), it is possible to shorten the time period for return from the power saving mode. Additionally, in the case that configuration data outside of priority configuration data is needed, it is possible to raise the possibility of shortening the time period for return. In the case that there are a plurality of configuration data, by storing only necessary priority configuration data to memory that is capable of being read at high speed (the RAM 111), it is possible to shorten the time to transition to the power saving mode.

Third Embodiment

Below, with reference to FIGS. 13A to 13C through FIG. 15 an explanation will be given for the third embodiment of the present invention. In the above described first and second embodiment, an explanation was given for cases where a power saving mode was the energy saving mode, but in the present embodiment, an explanation will be given for the low-power mode. In the present embodiment, since the energy saving mode is the low-power mode, even if an image processing unit constructed in the reconstruction unit 131 transitions to the energy saving mode, the circuit in the reconstruction unit 131 does not disappear. The priority configuration data is not loaded into the RAM 111, but rather the priority configuration data is constructed in the reconstruction unit 131 before transitioning to the low-power mode.

<Configuration Data and Reconstruction Unit Circuit State Example 3>

First, with reference to FIGS. 13A to 13C, an explanation will be given for configuration data storage control for the image processing apparatus 100 according to the present embodiment, and the state of the image processing circuit comprised in the reconstruction unit 131.

Figure 13A:
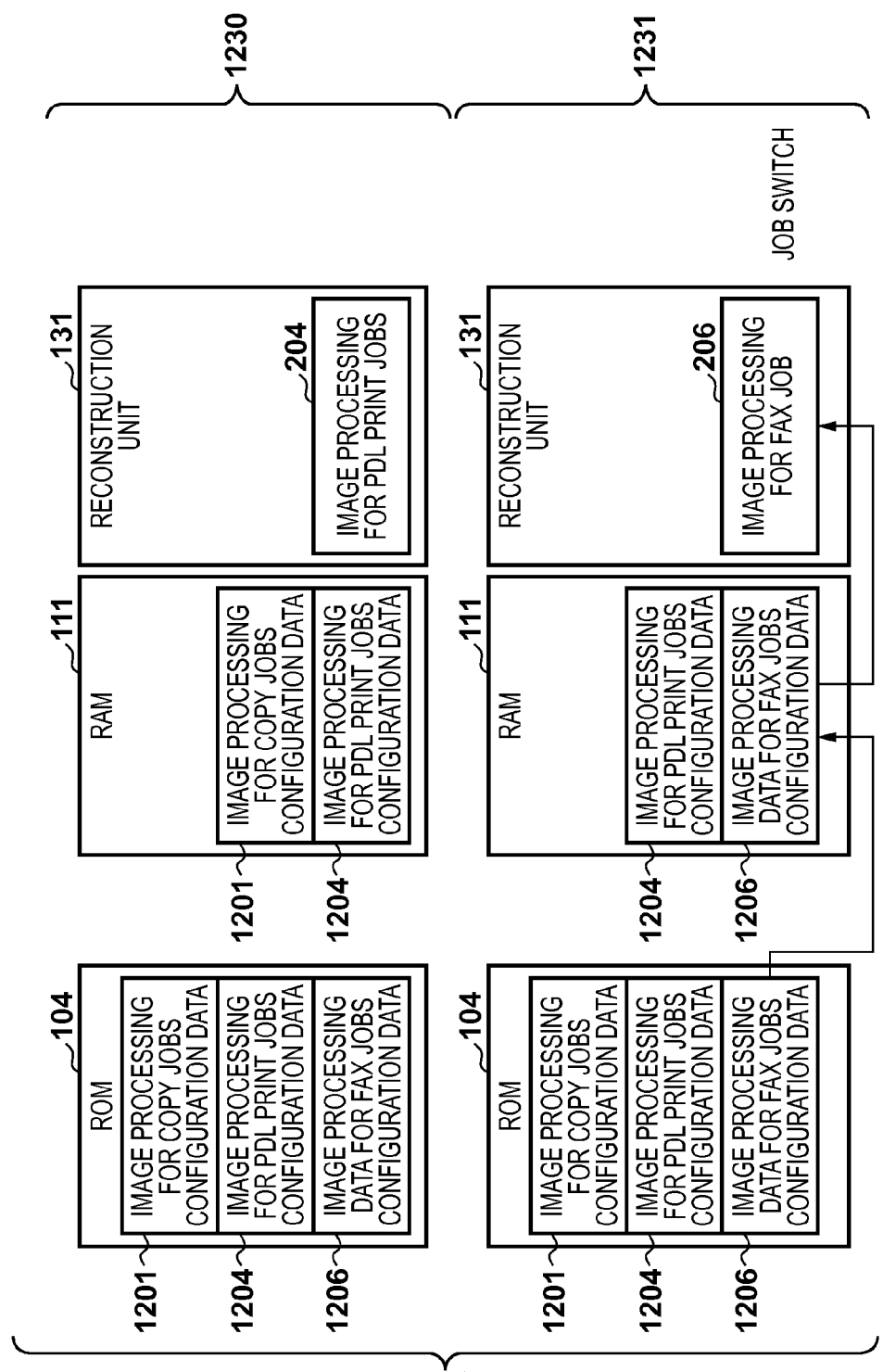
Figure 13B:
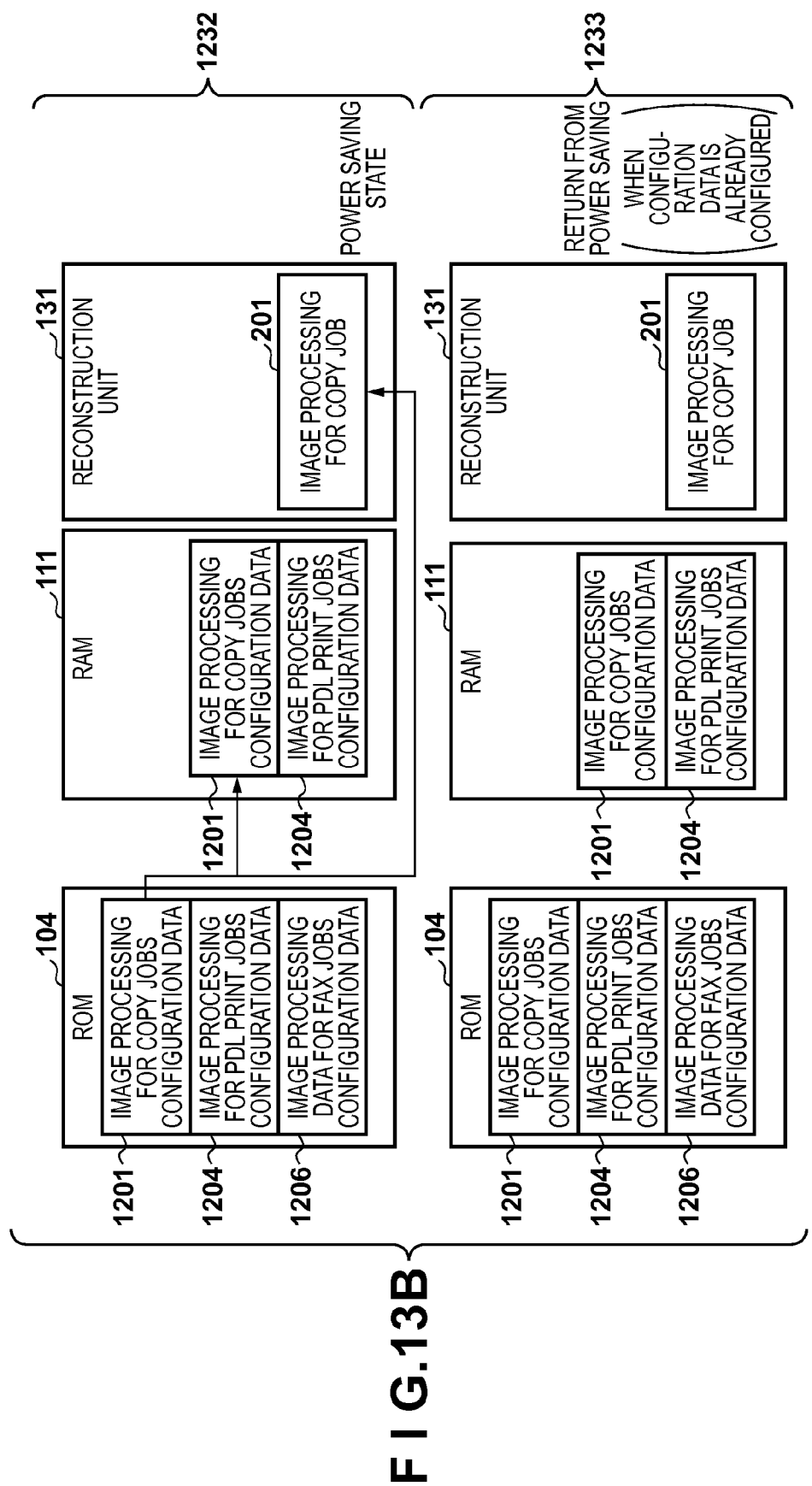

The configuration of FIGS. 13A to 13C and the definitions of the terms are the same as in the explanation of FIGS. 5A to 5C in the above described first embodiment, and so the explanation will be omitted. The difference between FIGS. 5A to 5C and FIGS. 13A to 13C is that since the energy saving mode is the low-power mode, the priority configuration data is constructed to the reconstruction unit 131, and when returning from the low-power mode, construction of the reconstruction unit 131 is unnecessary. In the present embodiment, only an explanation of parts that differ from FIGS. 9A to 9C according to the second embodiment that was previously explained will be given.

Since reference numerals 1230 and 1231 of FIG. 13A are the same as reference numerals 1220 and 1221 of FIG. 9A, an explanation of these will be omitted. Reference numeral 1232 of FIG. 13B denotes an example of configuration data and an image processing circuit of the reconstruction unit 131 in a case where transition is made into the power saving mode in step S103 of FIG. 4. When it is detected that transition is made into the power saving mode, the image processing for copy jobs configuration data 1201 and the image processing for PDL print jobs configuration data 1204 are copied from the ROM 104 into the RAM 111. At the same time that this processing is performed, priority configuration data is reconstructed in the reconstruction unit 131.

Reference numerals 1233 and 1234 in FIGS. 13B and 13C are examples of configuration data and the image processing circuits in the reconstruction unit 131 when returning from the power saving mode in step S106 of FIG. 4. Reference numeral 1233 is an example in which, after returning from sleep, it is detected if the job to be executed is a copy job, and since the image processing for copy jobs configuration data 1201 is already constructed for the reconstruction unit 131, construction is not required. Reference numeral 1234 is an example in which after returning from sleep, it is detected if the job to be executed is a PDL print job. Accordingly, since the image processing for PDL print jobs configuration data 1204 exists on the RAM 111 and not the ROM 104, it is read out from the RAM 111 and construction of the reconstruction unit 131 is performed. Since reference numeral 1235 of FIG. 13C is the same as reference numeral 1224 of FIG. 9C, an explanation will be omitted.

<Control Flow 3 when Transitioning into Low-Power Mode>

Figure 14:
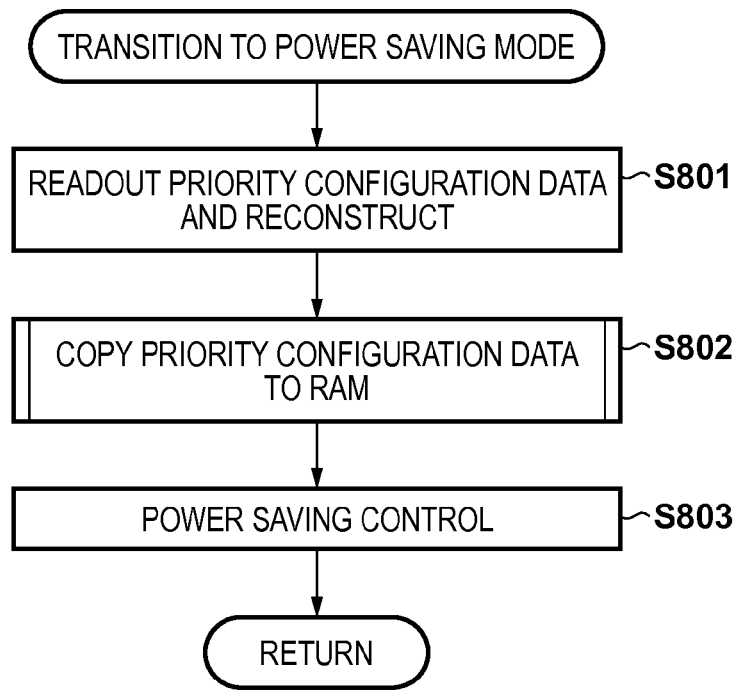
FIG. 14 is a flowchart for showing a control flow upon transition into the power saving mode according to the third embodiment.

Next, with reference to FIG. 14, an explanation will be given for a detailed processing procedure for step S103 of FIG. 4. The processing explained below is realized by the CPU 101 reading a control program stored in the ROM 104 in advance into the RAM 111 and executing it. Here, an explanation of the difference between the FIG. 7 and FIG. 11 of the above explained first and second embodiments will be given.

In step S801, before transitioning to the energy saving mode (the low-power mode), the CPU 101 constructs the priority configuration data and uses the priority configuration data to reconstruct the reconstruction unit 131. However, constructing in the reconstruction unit 131 is limited to one pattern. The one pattern does not mean that there is only one configuration data that can be constructed, but rather it means that there is only one set of combined configuration data. In step S802, the CPU 101 copies the priority configuration data from the ROM 104 to the RAM 111. In step S802, if it is the first embodiment, processing is performed that corresponds to step S301 of FIG. 7, and if it is the second embodiment, processing is performed that corresponds to step S601 through step S604 of FIG. 11. In step S803, the CPU 101 controls the power supply of each function to be OFF in order to transition into the power saving mode, a portion of the functions are disabled by clock-gating, and the low-power mode is transitioned into. Unlike the first and second embodiments, the power supply of the reconstruction unit 131 is not cut off.

<Control Flow 3 when Returning from the Power Saving Mode>

Figure 15:
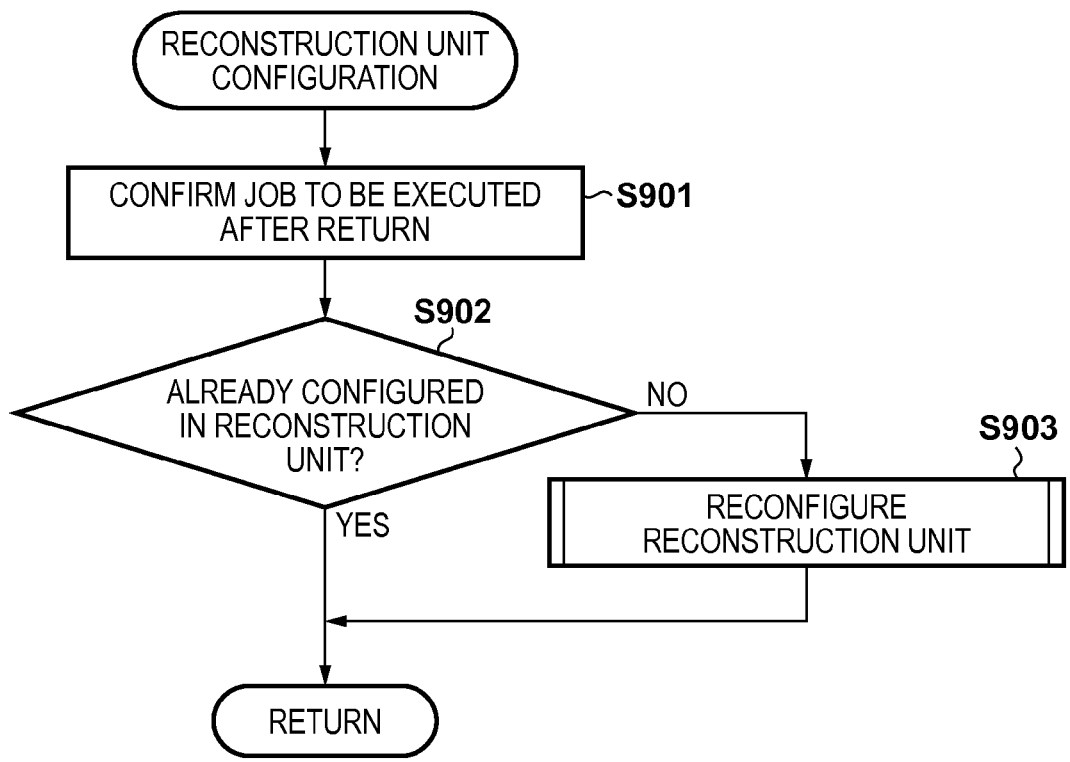
FIG. 15 is a flowchart for showing a control flow upon return from the power saving mode according to the third embodiment.

Next, with reference to FIG. 15, an explanation will be given for a detailed processing procedure for step S106 of FIG. 4. The processing explained below is realized by the CPU 101 reading a control program stored in the ROM 104 in advance into the RAM 111 and executing it. Here, mainly an explanation of the differences with FIG. 8 and FIG. 12 of the above explained first and second embodiments will be given.

In step S901, the CPU 101 confirms a job to be executed after returning from the power saving mode. Then, in step S902, in order to execute the job confirmed in step S901, the CPU 101 determines whether or not an image processing capability that corresponds to the required image processing circuit is constructed to the reconstruction unit 131. In the case that it is constructed, the process ends unchanged, and in the case that it is not constructed, processing transitions to step S903.

In step S903, since the image processing capabilities constructed on the reconstruction unit 131 cannot be used, the CPU 101 performs reconstruction of the reconstruction unit 131. Processing in step S903 corresponds to step S402 through step S404 in FIG. 8 if it is the above explained first embodiment, and if it is the above explained second embodiment, processing corresponds to step S702 through step S706 of FIG. 12.

As explained above, by virtue of the present embodiment, the construction of the reconstruction unit 131 using the priority configuration data is performed in advance, before transitioning to the low-power mode. As a result, in the case of the low-power mode where the power supply of the reconstruction unit 131 is not controlled to OFF, it is possible to further shorten the time period for return when compared to the case of the power saving mode.

Fourth Embodiment

Below, using FIG. 16, an explanation will be given for a fourth embodiment of the present invention. An explanation will be given of a method for shortening a return period from a power saving mode using a partial reconstruction in the present embodiment. The processing flow is the same as the processing flow explained in the above explained first through third embodiments. The difference between the processing explained in the above explained first through third embodiments lies in that for configuration data that is being prepared, each of the functions of the image processing unit shown in FIG. 2 is prepared as configuration data.

For example, in order to execute a copy job, in the end it is necessary to construct all functions shown in the image processing for copy jobs construction 201 of FIG. 2 in the reconstruction unit 131. However, in the present embodiment, the priority configuration data is controlled in more finely divided level component units, such as the read DMAC 250 and the write DMAC 251. A reason for making the priority configuration data be the read DMAC 250 and the write DMAC 251 is that these are used commonly in the image processing for copy jobs construction 201, the image processing for PDL print jobs construction 204, and the image processing for FAX jobs construction 206, as shown in FIG. 2.

According to the explanations given above for the first and second embodiments, when transitioning to the power saving mode, at least the configuration data of the read DMAC 250 and the write DMAC 251 is in a state in which it has been copied from the ROM 104 to the RAM 111. Basing the explanation on the above explained third embodiment, the configuration data of the read DMAC 250 and the write DMAC 251 is in a state in which it is constructed on the reconstruction unit 131.

First, referring to FIG. 16, an explanation will be given for storage destinations of configuration data when applied in the energy saving mode, and for example states of the image processing circuit that is constructed in the reconstruction unit 131. Read DMAC configuration data 1250 is configuration data of the read DMAC 250. Write DMAC configuration data 1251 is configuration data of the write DMAC 251. Also, processing module configuration data 1260 through 1262 are configuration data for each image processing capability, and are all the configuration data that is needed on the image processing apparatus 100. The present example is described in three parts.

Figure 16:
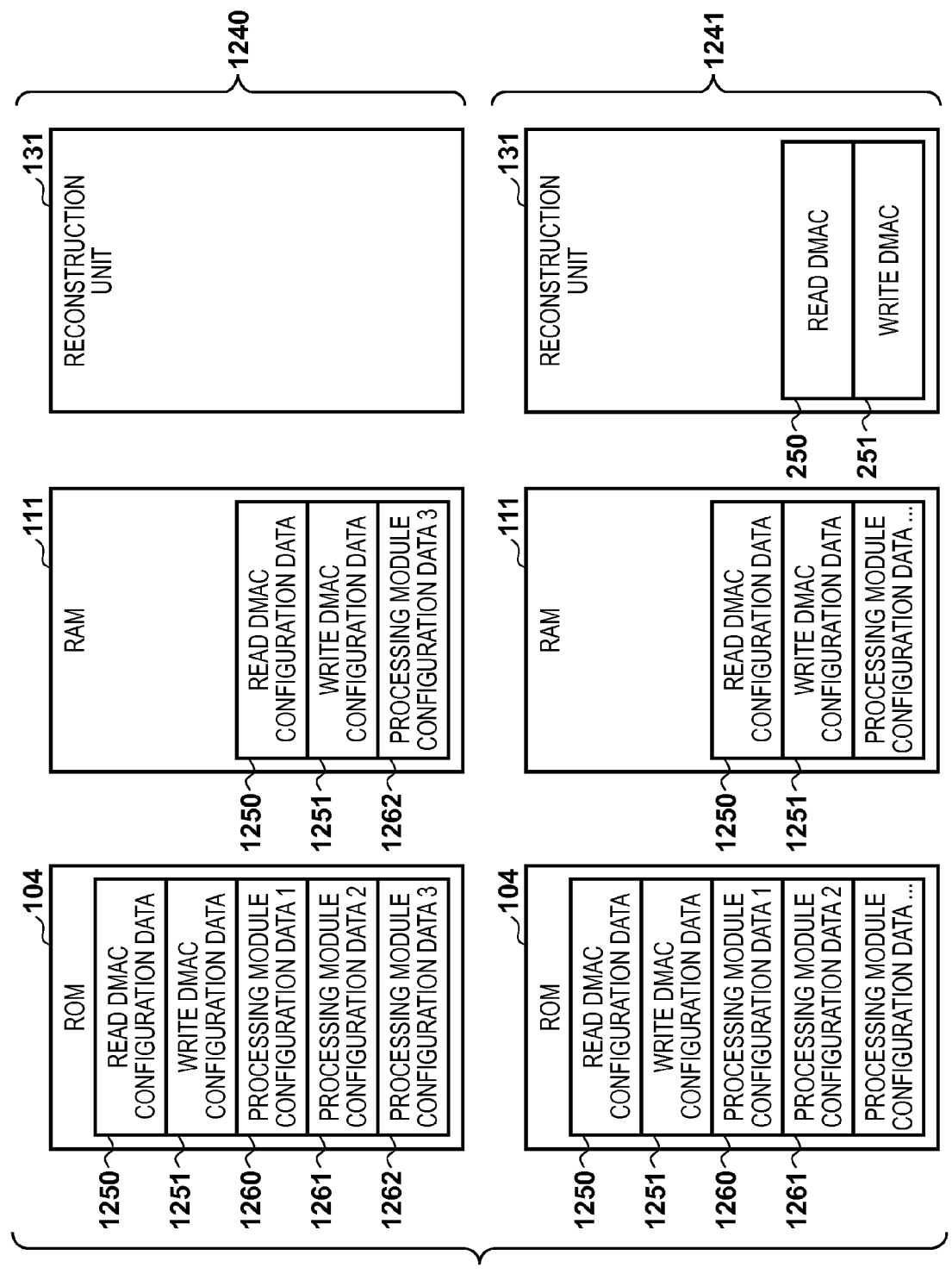
FIG. 16 is a view for showing a storage destination for configuration data of the image processing apparatus, and a state of an image processing circuit comprised in the reconstruction unit 131 according to the fourth embodiment.

Reference numeral 1240 in FIG. 16 is a case of the above described first and second embodiments, when the read DMAC configuration data 1250 and the write DMAC configuration data 1251 are stored in at least the RAM 111 when transitioning to the power saving mode. Additionally, in the case of reference numeral 1240 in the above explained second embodiment, there is a space in capacity for storing configuration data within the RAM 111 even if the priority configuration data is stored, and the state is such that a portion of configuration data of a processing module used in a normal state remains in the RAM 111.

Reference numeral 1241 of FIG. 16 is a case of the third embodiment, and when transitioning to the low-power mode, similarly to in reference numeral 1240, at least the read DMAC configuration data 1250 and the write DMAC configuration data 1251 are stored in the RAM 111. Additionally, the read DMAC 250 and the write DMAC 251 which are processing functions corresponding to the priority configuration data are constructed in the reconstruction unit 131.

As explained above, by virtue of the present embodiment, even more than in the first through third embodiments explained above, configuration data is constructed at a finer component level, and partial reconstruction is performed. Because of this, during partial reconstruction it is possible to shorten the time period for return from the power saving mode and the low-power mode in the same flow shown in the above explained first through third embodiments.

Also, for the above explained first through fourth embodiments, configuration data is stored in the ROM 104, however it only needs to be non-volatile memory, and capable of being read out. For example, it could be a hard disk (not shown). Also, if the configuration data can be read out through the network I/F 102, it could be on a server on a network (not shown).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-050533 filed Mar. 13, 2014, which is hereby incorporated by reference herein in its entirety.

What is claimed is:

1. An image processing apparatus comprising:
   (A) a reconstruction circuit for which reconstruction based on construction data is possible, and configured to perform image processing in accordance with constructed function blocks;
   (B) a first storage unit configured to store the construction data, the first storage unit having a reading speed;
   (C) a second storage unit configured to store the construction data and having a faster reading speed than that of the first storage unit;
   (D) a control unit configured, when the image processing apparatus transitions to a power saving state, to write the construction data, which is stored in the first storage unit, in the second storage unit and configured, when the image processing apparatus returns from the power saving state, to read the construction data stored in the second storage unit and to reconstruct the reconstruction circuit based on the read construction data.

2. The image processing apparatus according to claim 1, wherein the reconstruction unit reconstructs the reconstruction circuit by reading the construction data from the first storage unit if the construction data is not stored in the second storage unit.

3. The image processing apparatus according to claim 1, wherein the reconstruction unit, if the construction data is not stored in the second storage unit, reads, from the second storage unit, the construction data after writing in the second storage unit by the writing unit and reconstructs the reconstruction circuit using the read construction data.

4. The image processing apparatus according to claim 1, wherein the reconstruction unit, when the image processing apparatus returns from the power saving state, reconstructs the reconstruction circuit with the construction data of a functional block of the reconstruction circuit that has a high possibility of being required next.

5. The image processing apparatus according to claim 1, wherein the writing unit, when a low-power state is transitioned into, reconstructs the reconstruction circuit with the construction data of a functional block of the reconstruction circuit that has a high possibility of being required next.

6. The image processing apparatus according to claim 1, further comprising a designation unit configured to designate the construction data of a functional block that has a high possibility of being required next.

7. The image processing apparatus according to claim 1, wherein the writing unit, out of construction data previously written to the second storage unit, deletes a functional block of the reconstruction circuit that has a low possibility of being required next, and writes into the second storage unit the construction data of a functional block that has a high possibility of being required next.

8. The image processing apparatus according to claim 1, wherein the reconstruction circuit is capable of partially reconstructing only a portion of a circuit construction.

9. A method of controlling an image processing apparatus having a reconstruction circuit for which reconstruction based on construction data is possible and for performing image processing in accordance with constructed function blocks, a first storage unit for storing the construction data, the first storage unit having a reading speed, and a second storage unit for storing the construction data and having a faster reading speed than that of the first storage unit, the method comprising:
   when the image processing apparatus transitions to a power saving state, writing the construction data, which is stored in the first storage unit, in the second storage unit; and
   when the image processing apparatus returns from the power saving state, reading the construction data stored in the second storage unit and reconstructing the reconstruction circuit based on the read construction data.

10. A non-transitory computer-readable storage medium storing a program for causing a computer to execute a method of controlling an image processing apparatus having a reconstruction circuit for which reconstruction based on construction data is possible and for performing image processing in accordance with constructed function blocks, a first storage unit for storing the construction data, the first storage unit having a reading speed, and a second storage unit for storing the construction data and having a faster reading speed than that of the first storage unit, the method comprising:
   when the image processing apparatus transitions to a power saving state, writing the construction data, which is stored in the first storage unit, in the second storage unit; and
   when the image processing apparatus returns from the power saving state, reading the construction data stored in the second storage unit and reconstructing the reconstruction circuit based on the read construction data.

* * * * *